(12) United States Patent
Celikyilmaz et al.

(10) Patent No.: US 11,640,620 B2
(45) Date of Patent: *May 2, 2023

(54) SYSTEMS AND METHODS TO ORGANIZE AND CONSOLIDATE DATA FOR IMPROVED DATA STORAGE AND PROCESSING

(71) Applicant: Visa International Service Association, San Francisco, CA (US)

(72) Inventors: Ilker Celikyilmaz, Mountain View, CA (US); Raman Chinnappan, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 119 days.

This patent is subject to a terminal disclaimer.

(21) Appl. No.: 17/199,490

(22) Filed: Mar. 12, 2021

(65) Prior Publication Data
US 2021/0201343 A1 Jul. 1, 2021

Related U.S. Application Data

(63) Continuation of application No. 16/434,271, filed on Jun. 7, 2019, now Pat. No. 10,977,679, which is a
(Continued)

(51) Int. Cl.
*G06Q 30/02* (2023.01)
*G06Q 30/0207* (2023.01)
(Continued)

(52) U.S. Cl.
CPC ....... *G06Q 30/0222* (2013.01); *G06F 16/283* (2019.01); *G06Q 20/387* (2013.01); *G06Q 20/405* (2013.01); *G06Q 30/00* (2013.01)

(58) Field of Classification Search
CPC ............ G06Q 30/0222; G06Q 20/387; G06Q 20/405; G06F 16/283
See application file for complete search history.

(56) References Cited

U.S. PATENT DOCUMENTS

| 4,613,904 A | 9/1986 | Lurie |
| 4,906,826 A | 3/1990 | Spencer |

(Continued)

FOREIGN PATENT DOCUMENTS

| JP | H05205157 A | 8/1993 |
| JP | 08329323 A | 12/1996 |

(Continued)

OTHER PUBLICATIONS

"Airline Miles Reward Credit Cards", Credit Card Finder, 2009, 2 pages, retrieved at http://www.plasticrewards.com/airline-miles-reward.

(Continued)

*Primary Examiner* — Scott C Anderson
(74) *Attorney, Agent, or Firm* — The Webb Law Firm

(57) ABSTRACT

Systems and methods to dynamically combine offer data records in accordance with predetermined rules such that the data records that are required to be monitored for processing are reduced and the computation efficiency in processing the transactions and relevant offers is improved in a transaction handler configured on an electronic processing network to process a huge amount of transactions in real time and a rapidly increasing number of offers.

20 Claims, 12 Drawing Sheets

Related U.S. Application Data continuation of application No. 14/712,669, filed on May 14, 2015, now Pat. No. 10,354,268.

(60) Provisional application No. 61/994,004, filed on May 15, 2014.

(51) Int. Cl.
*G06Q 20/38* (2012.01)
*G06Q 20/40* (2012.01)
*G06F 16/28* (2019.01)
*G06Q 30/00* (2023.01)

(56) References Cited

U.S. PATENT DOCUMENTS

| | | | |
|---|---|---|---|
| 4,914,590 | A | 4/1990 | Loatman et al. |
| 4,941,090 | A | 7/1990 | McCarthy |
| 5,025,372 | A | 6/1991 | Burton et al. |
| 5,117,355 | A | 5/1992 | McCarthy |
| 5,202,826 | A | 4/1993 | McCarthy |
| 5,287,268 | A | 2/1994 | McCarthy |
| 5,401,946 | A | 3/1995 | Weinblatt |
| 5,592,560 | A | 1/1997 | Deaton et al. |
| 5,604,921 | A | 2/1997 | Alanara |
| 5,621,812 | A | 4/1997 | Deaton et al. |
| 5,638,457 | A | 6/1997 | Deaton et al. |
| 5,684,990 | A | 11/1997 | Boothby |
| 5,687,322 | A | 11/1997 | Deaton et al. |
| 5,689,100 | A | 11/1997 | Carrithers et al. |
| 5,710,886 | A | 1/1998 | Christensen et al. |
| 5,745,036 | A | 4/1998 | Clare |
| 5,774,870 | A | 6/1998 | Storey |
| RE36,116 | E | 2/1999 | McCarthy |
| 5,870,030 | A | 2/1999 | DeLuca et al. |
| 5,923,016 | A | 7/1999 | Fredregill et al. |
| 5,924,080 | A | 7/1999 | Johnson |
| 5,937,391 | A | 8/1999 | Ikeda et al. |
| 5,956,694 | A | 9/1999 | Powell |
| 5,974,396 | A | 10/1999 | Anderson et al. |
| 6,032,136 | A | 2/2000 | Brake, Jr. et al. |
| 6,035,280 | A | 3/2000 | Christensen |
| 6,055,573 | A | 4/2000 | Gardenswartz et al. |
| 6,065,675 | A | 5/2000 | Teicher |
| 6,067,529 | A | 5/2000 | Ray et al. |
| 6,070,147 | A | 5/2000 | Harms et al. |
| 6,101,484 | A | 8/2000 | Halbert et al. |
| 6,119,101 | A | 9/2000 | Peckover |
| 6,119,933 | A | 9/2000 | Wong et al. |
| 6,138,911 | A | 10/2000 | Fredregill et al. |
| 6,216,129 | B1 | 4/2001 | Eldering |
| 6,222,914 | B1 | 4/2001 | McMullin |
| 6,226,642 | B1 | 5/2001 | Beranek et al. |
| 6,243,687 | B1 | 6/2001 | Powell |
| 6,251,017 | B1 | 6/2001 | Leason et al. |
| 6,282,516 | B1 | 8/2001 | Giuliani |
| 6,282,522 | B1 | 8/2001 | Davis et al. |
| 6,285,983 | B1 | 9/2001 | Jenkins |
| 6,292,786 | B1 | 9/2001 | Deaton et al. |
| 6,298,330 | B1 | 10/2001 | Gardenswartz et al. |
| 6,307,958 | B1 | 10/2001 | Deaton et al. |
| 6,313,732 | B1 | 11/2001 | DeLuca et al. |
| 6,318,631 | B1 | 11/2001 | Halperin |
| 6,318,911 | B1 | 11/2001 | Kitahara |
| 6,321,201 | B1 | 11/2001 | Dahl |
| 6,324,519 | B1 | 11/2001 | Eldering |
| 6,327,574 | B1 | 12/2001 | Kramer et al. |
| 6,332,126 | B1 | 12/2001 | Peirce et al. |
| 6,334,108 | B1 | 12/2001 | Deaton et al. |
| 6,334,110 | B1 | 12/2001 | Walter et al. |
| 6,336,099 | B1 | 1/2002 | Barnett et al. |
| 6,341,353 | B1 | 1/2002 | Herman et al. |
| 6,377,935 | B1 | 4/2002 | Deaton et al. |
| 6,408,286 | B1 | 6/2002 | Heiden |
| 6,450,407 | B1 | 9/2002 | Freeman et al. |
| 6,487,538 | B1 | 11/2002 | Gupta et al. |
| 6,505,046 | B1 | 1/2003 | Baker |
| 6,505,168 | B1 | 1/2003 | Rothman et al. |
| 6,519,571 | B1 | 2/2003 | Guheen et al. |
| 6,594,640 | B1 | 7/2003 | Postrel |
| 6,604,089 | B1 | 8/2003 | Van Horn et al. |
| 6,604,239 | B1 | 8/2003 | Kohen |
| 6,606,745 | B2 | 8/2003 | Maggio |
| 6,609,104 | B1 | 8/2003 | Deaton et al. |
| 6,631,356 | B1 | 10/2003 | Van Horn et al. |
| 6,631,372 | B1 | 10/2003 | Graham |
| 6,647,257 | B2 | 11/2003 | Owensby |
| 6,647,269 | B2 | 11/2003 | Hendrey et al. |
| 6,663,105 | B1 | 12/2003 | Sullivan et al. |
| 6,685,093 | B2 | 2/2004 | Challa et al. |
| 6,721,743 | B1 | 4/2004 | Sakakibara |
| 6,732,081 | B2 | 5/2004 | Nicholson |
| 6,736,322 | B2 | 5/2004 | Gobburu et al. |
| 6,741,968 | B2 | 5/2004 | Jacoves et al. |
| 6,742,003 | B2 | 5/2004 | Heckerman et al. |
| 6,748,365 | B1 | 6/2004 | Quinlan et al. |
| 6,749,120 | B2 | 6/2004 | Hung et al. |
| 6,775,539 | B2 | 8/2004 | Deshpande |
| 6,820,061 | B2 | 11/2004 | Postrel |
| 6,829,586 | B2 | 12/2004 | Postrel |
| 6,834,110 | B1 | 12/2004 | Marconcini et al. |
| 6,842,739 | B2 | 1/2005 | Postrel |
| 6,856,820 | B1 | 2/2005 | Kolls |
| 6,856,992 | B2 | 2/2005 | Britton et al. |
| 6,865,547 | B1 | 3/2005 | Brake, Jr. et al. |
| 6,877,665 | B2 | 4/2005 | Challa et al. |
| 6,901,406 | B2 | 5/2005 | Nabe et al. |
| 6,912,398 | B1 | 6/2005 | Domnitz |
| 6,922,686 | B2 | 7/2005 | Okamoto et al. |
| 6,925,441 | B1 | 8/2005 | Jones, III et al. |
| 6,934,508 | B2 | 8/2005 | Ceresoli et al. |
| 6,934,690 | B1 | 8/2005 | Van Horn et al. |
| 6,937,995 | B1 | 8/2005 | Kepecs |
| 6,938,022 | B1 | 8/2005 | Singhal |
| 6,941,376 | B2 | 9/2005 | Mitchell et al. |
| 6,947,898 | B2 | 9/2005 | Postrel |
| 6,978,250 | B1 | 12/2005 | Kawan et al. |
| 6,996,560 | B1 | 2/2006 | Choi et al. |
| 7,003,476 | B1 | 2/2006 | Samra et al. |
| 7,013,286 | B1 | 3/2006 | Aggarwal et al. |
| 7,024,374 | B1 | 4/2006 | Day et al. |
| 7,024,409 | B2 | 4/2006 | Iyengar |
| 7,028,906 | B2 | 4/2006 | Challa et al. |
| 7,035,855 | B1 | 4/2006 | Kilger et al. |
| 7,039,599 | B2 | 5/2006 | Merriman et al. |
| 7,054,830 | B1 | 5/2006 | Eggleston et al. |
| 7,062,510 | B1 | 6/2006 | Eldering |
| 7,072,847 | B2 | 7/2006 | Ulenas et al. |
| 7,072,864 | B2 | 7/2006 | Brake, Jr. et al. |
| 7,096,190 | B2 | 8/2006 | Postrel |
| 7,107,230 | B1 | 9/2006 | Halbert et al. |
| 7,107,249 | B2 | 9/2006 | Dively et al. |
| 7,120,590 | B1 | 10/2006 | Eisen et al. |
| 7,124,099 | B2 | 10/2006 | Mesaros |
| 7,134,087 | B2 | 11/2006 | Bushold et al. |
| 7,143,143 | B1 | 11/2006 | Thompson |
| 7,146,330 | B1 | 12/2006 | Alon et al. |
| 7,158,943 | B2 | 1/2007 | van der Riet |
| 7,158,955 | B2 | 1/2007 | Diveley et al. |
| 7,162,436 | B1 | 1/2007 | Eckel, Jr. |
| 7,163,145 | B2 | 1/2007 | Cohagan et al. |
| 7,165,037 | B2 | 1/2007 | Lazarus et al. |
| 7,177,822 | B2 | 2/2007 | Mahmood et al. |
| 7,181,412 | B1 | 2/2007 | Fulgoni et al. |
| 7,181,419 | B1 | 2/2007 | Mesaros |
| 7,194,422 | B1 | 3/2007 | St. John Killick |
| 7,194,427 | B1 | 3/2007 | Van Horn et al. |
| 7,225,142 | B1 | 5/2007 | Apte et al. |
| 7,257,545 | B1 | 8/2007 | Hung |
| 7,260,837 | B2 | 8/2007 | Abraham et al. |
| 7,263,498 | B1 | 8/2007 | Van Horn et al. |
| 7,263,507 | B1 | 8/2007 | Brake, Jr. et al. |
| 7,264,152 | B2 | 9/2007 | Tsuei et al. |
| 7,269,578 | B2 | 9/2007 | Sweeney |

(56) References Cited

U.S. PATENT DOCUMENTS

| | | |
|---|---|---|
| 7,299,194 B1 | 11/2007 | Manganaris et al. |
| 7,308,254 B1 | 12/2007 | Rissanen |
| 7,328,169 B2 | 2/2008 | Temares et al. |
| 7,330,110 B1 | 2/2008 | Heintzman et al. |
| 7,333,998 B2 | 2/2008 | Heckerman et al. |
| 7,337,127 B1 | 2/2008 | Smith et al. |
| 7,340,438 B2 | 3/2008 | Nordman et al. |
| 7,359,866 B2 | 4/2008 | Farat |
| 7,360,251 B2 | 4/2008 | Spalink et al. |
| 7,363,246 B1 | 4/2008 | Van Horn et al. |
| 7,370,811 B2 | 5/2008 | Turner et al. |
| 7,373,311 B2 | 5/2008 | Lambert et al. |
| 7,376,580 B1 | 5/2008 | Walker et al. |
| 7,398,225 B2 | 7/2008 | Voltmer et al. |
| 7,398,226 B2 | 7/2008 | Haines et al. |
| 7,401,731 B1 | 7/2008 | Pletz et al. |
| 7,415,537 B1 | 8/2008 | Maes |
| 7,424,439 B1 | 9/2008 | Fayyad et al. |
| 7,424,441 B2 | 9/2008 | George et al. |
| 7,424,617 B2 | 9/2008 | Boyd et al. |
| 7,428,498 B2 | 9/2008 | Voltmer et al. |
| 7,444,658 B1 | 10/2008 | Matz et al. |
| 7,480,627 B1 | 1/2009 | Van Horn et al. |
| 7,490,052 B2 | 2/2009 | Kilger et al. |
| 7,493,655 B2 | 2/2009 | Brown |
| 7,496,524 B2 | 2/2009 | Voltmer et al. |
| 7,526,485 B2 | 4/2009 | Hagan et al. |
| 7,533,038 B2 | 5/2009 | Blume et al. |
| 7,533,130 B2 | 5/2009 | Narayana et al. |
| 7,536,360 B2 | 5/2009 | Stolfo et al. |
| 7,552,069 B2 | 6/2009 | Kepecs |
| 7,562,030 B1 | 7/2009 | Shapira et al. |
| 7,578,430 B2 | 8/2009 | Michelsen et al. |
| 7,578,435 B2 | 8/2009 | Suk |
| 7,593,871 B1 | 9/2009 | Mesaros |
| 7,606,730 B2 | 10/2009 | Antonucci |
| 7,613,628 B2 | 11/2009 | Ariff et al. |
| 7,613,629 B2 | 11/2009 | Antonucci et al. |
| 7,624,041 B2 | 11/2009 | Postrel |
| 7,624,184 B1 | 11/2009 | Aviani et al. |
| 7,665,660 B2 | 2/2010 | Degliantoni et al. |
| 7,668,785 B1 | 2/2010 | Hammad |
| 7,680,688 B2 | 3/2010 | Hessburg et al. |
| 7,686,218 B2 | 3/2010 | Hessburg et al. |
| 7,689,463 B1 | 3/2010 | Mesaros |
| 7,689,469 B1 | 3/2010 | Mesaros |
| 7,693,748 B1 | 4/2010 | Mesaros |
| 7,729,945 B1 | 6/2010 | Katz et al. |
| 7,729,977 B2 | 6/2010 | Xiao et al. |
| 7,742,943 B2 | 6/2010 | Postrel |
| 7,747,473 B1 | 6/2010 | Mesaros |
| 7,753,264 B2 | 7/2010 | Shafer et al. |
| 7,765,124 B2 | 7/2010 | Postrel |
| 7,769,630 B2 | 8/2010 | Postrel |
| 7,777,053 B2 | 8/2010 | Sanganbhatla et al. |
| 7,792,518 B2 | 9/2010 | Trioano et al. |
| 7,828,206 B2 | 11/2010 | Hessburg et al. |
| 7,844,490 B2 | 11/2010 | Patterson |
| 7,853,529 B1 | 12/2010 | Walker et al. |
| 7,868,218 B2 | 1/2011 | Clark et al. |
| 7,870,022 B2 | 1/2011 | Bous et al. |
| 7,894,634 B2 | 2/2011 | Chung |
| 7,904,337 B2 | 3/2011 | Morsa |
| 7,904,389 B2 | 3/2011 | DiGioacchino |
| 7,917,388 B2 | 3/2011 | van der Riet |
| 7,933,800 B2 | 4/2011 | Main et al. |
| 7,933,841 B2 | 4/2011 | Schmeyer et al. |
| 7,937,291 B2 | 5/2011 | Carlson et al. |
| 7,953,219 B2 | 5/2011 | Freedman et al. |
| 7,970,705 B2 | 6/2011 | Patterson |
| 8,010,405 B1 | 8/2011 | Bortolin et al. |
| 8,019,685 B2 | 9/2011 | Patterson |
| 8,046,256 B2 | 10/2011 | Chien et al. |
| 8,050,968 B2 | 11/2011 | Antonucci et al. |
| 8,055,536 B1 | 11/2011 | Olaiya et al. |
| 8,099,318 B2 | 1/2012 | Moukas et al. |
| 8,103,545 B2 | 1/2012 | Ramer et al. |
| 8,103,588 B2 | 1/2012 | Patterson |
| 8,131,875 B1 | 3/2012 | Chen et al. |
| 8,140,389 B2 | 3/2012 | Altberg et al. |
| 8,155,999 B2 | 4/2012 | de Boer et al. |
| 8,180,671 B2 | 5/2012 | Cohagan et al. |
| 8,229,819 B2 | 7/2012 | Ransom et al. |
| 8,265,993 B2 | 9/2012 | Chien et al. |
| 8,285,643 B2 | 10/2012 | Isaacson et al. |
| 8,301,593 B2 | 10/2012 | Hoffmann et al. |
| 8,302,030 B2 | 10/2012 | Soroca et al. |
| 8,311,845 B2 | 11/2012 | Vengroff et al. |
| 8,313,023 B1 | 11/2012 | McGhie et al. |
| 8,315,929 B2 | 11/2012 | Allen-Rouman et al. |
| 8,332,290 B1 | 12/2012 | Venturo et al. |
| 8,332,323 B2 | 12/2012 | Stals et al. |
| 8,341,038 B1 | 12/2012 | Rolf et al. |
| 8,342,399 B1 | 1/2013 | McGhie et al. |
| 8,387,858 B2 | 3/2013 | Bohn et al. |
| 8,401,967 B1 | 3/2013 | Postrel |
| 8,417,543 B2 | 4/2013 | Yanak et al. |
| 8,458,017 B2 | 6/2013 | Shin |
| 8,463,919 B2 | 6/2013 | Tarquini et al. |
| 8,478,640 B2 | 7/2013 | Postrel |
| 8,478,692 B2 | 7/2013 | Carlson et al. |
| 8,511,550 B1 | 8/2013 | McGhie et al. |
| 8,666,812 B1 | 3/2014 | Gandhi |
| 9,460,436 B2 | 10/2016 | Ovick et al. |
| 9,792,619 B2 | 10/2017 | Roberts et al. |
| 2001/0027413 A1 | 10/2001 | Bhutta |
| 2001/0049620 A1 | 12/2001 | Blasko |
| 2001/0054003 A1 | 12/2001 | Chien et al. |
| 2002/0002597 A1 | 1/2002 | Morrell |
| 2002/0004733 A1 | 1/2002 | Addante |
| 2002/0004754 A1 | 1/2002 | Gardenswartz et al. |
| 2002/0019768 A1 | 2/2002 | Fredrickson et al. |
| 2002/0032602 A1 | 3/2002 | Lanzillo, Jr. et al. |
| 2002/0032904 A1 | 3/2002 | Lerner |
| 2002/0042738 A1 | 4/2002 | Srinivasan et al. |
| 2002/0046116 A1 | 4/2002 | Hohle et al. |
| 2002/0046187 A1 | 4/2002 | Vargas et al. |
| 2002/0053076 A1 | 5/2002 | Landesmann |
| 2002/0059100 A1 | 5/2002 | Shore |
| 2002/0060246 A1 | 5/2002 | Gobburu et al. |
| 2002/0062249 A1 | 5/2002 | Iannacci |
| 2002/0065713 A1 | 5/2002 | Awada et al. |
| 2002/0065723 A1 | 5/2002 | Anderson et al. |
| 2002/0070278 A1 | 6/2002 | Hung et al. |
| 2002/0072931 A1 | 6/2002 | Card |
| 2002/0077871 A1 | 6/2002 | Udelhoven et al. |
| 2002/0082918 A1 | 6/2002 | Warwick |
| 2002/0091569 A1 | 7/2002 | Kitaura et al. |
| 2002/0095387 A1 | 7/2002 | Sosa et al. |
| 2002/0099649 A1 | 7/2002 | Lee et al. |
| 2002/0102993 A1 | 8/2002 | Hendrey et al. |
| 2002/0103703 A1 | 8/2002 | Spetalnick |
| 2002/0107738 A1 | 8/2002 | Beach et al. |
| 2002/0123926 A1 | 9/2002 | Bushold et al. |
| 2002/0123928 A1 | 9/2002 | Eldering et al. |
| 2002/0128908 A1 | 9/2002 | Levin et al. |
| 2002/0128916 A1 | 9/2002 | Beinecke |
| 2002/0133400 A1 | 9/2002 | Terry et al. |
| 2002/0133405 A1 | 9/2002 | Newnam et al. |
| 2002/0138346 A1 | 9/2002 | Kodaka et al. |
| 2002/0147645 A1 | 10/2002 | Alao et al. |
| 2002/0160761 A1 | 10/2002 | Wolfe |
| 2002/0161625 A1 | 10/2002 | Brito-Valladares et al. |
| 2002/0174013 A1 | 11/2002 | Freeman et al. |
| 2002/0194137 A1 | 12/2002 | Park et al. |
| 2003/0004808 A1 | 1/2003 | Elhaoussine et al. |
| 2003/0018652 A1 | 1/2003 | Heckerman et al. |
| 2003/0040964 A1 | 2/2003 | Lacek |
| 2003/0046153 A1 | 3/2003 | Robibero |
| 2003/0047602 A1 | 3/2003 | Iida et al. |
| 2003/0055727 A1 | 3/2003 | Walker et al. |
| 2003/0058261 A1 | 3/2003 | Challa et al. |
| 2003/0074267 A1 | 4/2003 | Acharya et al. |
| 2003/0078864 A1 | 4/2003 | Hardesty et al. |

(56) References Cited

U.S. PATENT DOCUMENTS

| | | |
|---|---|---|
| 2003/0093314 A1 | 5/2003 | Leung et al. |
| 2003/0093329 A1 | 5/2003 | Gutta |
| 2003/0115113 A1 | 6/2003 | Duncan |
| 2003/0144907 A1 | 7/2003 | Cohen, Jr. et al. |
| 2003/0191832 A1 | 10/2003 | Satyavolu et al. |
| 2003/0212595 A1 | 11/2003 | Antonucci |
| 2003/0216967 A1 | 11/2003 | Williams |
| 2003/0225618 A1 | 12/2003 | Hessburg et al. |
| 2003/0230630 A1 | 12/2003 | Whipple et al. |
| 2003/0233439 A1 | 12/2003 | Stone et al. |
| 2003/0236704 A1 | 12/2003 | Antonucci |
| 2003/0236712 A1 | 12/2003 | Antonucci et al. |
| 2004/0019518 A1 | 1/2004 | Abraham et al. |
| 2004/0024632 A1 | 2/2004 | Perry |
| 2004/0049423 A1 | 3/2004 | Kawashima et al. |
| 2004/0054575 A1 | 3/2004 | Marshall |
| 2004/0054577 A1 | 3/2004 | Inoue et al. |
| 2004/0054581 A1 | 3/2004 | Redford et al. |
| 2004/0054591 A1 | 3/2004 | Spaeth et al. |
| 2004/0073482 A1 | 4/2004 | Wiggins et al. |
| 2004/0083170 A1 | 4/2004 | Bam et al. |
| 2004/0088216 A1 | 5/2004 | Bangalore |
| 2004/0093512 A1 | 5/2004 | Sample |
| 2004/0099730 A1 | 5/2004 | Tuchler et al. |
| 2004/0104760 A1 | 6/2004 | Ando |
| 2004/0117250 A1 | 6/2004 | Lubow et al. |
| 2004/0122735 A1 | 6/2004 | Meshkin |
| 2004/0122736 A1 | 6/2004 | Strock et al. |
| 2004/0127192 A1 | 7/2004 | Ceresoli et al. |
| 2004/0133472 A1 | 7/2004 | Leason et al. |
| 2004/0133474 A1 | 7/2004 | Tami et al. |
| 2004/0138949 A1 | 7/2004 | Darnton et al. |
| 2004/0144839 A1 | 7/2004 | Warwick |
| 2004/0148224 A1 | 7/2004 | Gauthier et al. |
| 2004/0167815 A1 | 8/2004 | DeLaHunt |
| 2004/0181554 A1 | 9/2004 | Heckerman et al. |
| 2004/0186773 A1 | 9/2004 | George et al. |
| 2004/0193489 A1 | 9/2004 | Boyd et al. |
| 2004/0193685 A1 | 9/2004 | Proehl |
| 2004/0203648 A1 | 10/2004 | Wong |
| 2004/0225509 A1 | 11/2004 | Andre |
| 2004/0225603 A1 | 11/2004 | Allen et al. |
| 2004/0238622 A1 | 12/2004 | Freiberg |
| 2004/0249650 A1 | 12/2004 | Freedman et al. |
| 2004/0249710 A1 | 12/2004 | Smith et al. |
| 2004/0260608 A1 | 12/2004 | Lewis et al. |
| 2004/0267611 A1 | 12/2004 | Hoerenz |
| 2005/0010533 A1 | 1/2005 | Cooper |
| 2005/0021399 A1 | 1/2005 | Postrel |
| 2005/0021401 A1 | 1/2005 | Postrel |
| 2005/0055275 A1 | 3/2005 | Newman et al. |
| 2005/0060225 A1 | 3/2005 | Postrel |
| 2005/0071222 A1 | 3/2005 | Bigus et al. |
| 2005/0071225 A1 | 3/2005 | Bortolin et al. |
| 2005/0071227 A1 | 3/2005 | Hammad et al. |
| 2005/0071230 A1 | 3/2005 | Mankoff |
| 2005/0071235 A1 | 3/2005 | Nguyen et al. |
| 2005/0080727 A1 | 4/2005 | Postrel |
| 2005/0091152 A1 | 4/2005 | Suisa |
| 2005/0114213 A1 | 5/2005 | Smith et al. |
| 2005/0119938 A1 | 6/2005 | Smith et al. |
| 2005/0125342 A1 | 6/2005 | Schiff |
| 2005/0131761 A1 | 6/2005 | Trika et al. |
| 2005/0131762 A1 | 6/2005 | Bharat et al. |
| 2005/0131792 A1 | 6/2005 | Rowe |
| 2005/0133590 A1 | 6/2005 | Rettenmyer et al. |
| 2005/0144074 A1 | 6/2005 | Fredregill et al. |
| 2005/0149394 A1 | 7/2005 | Postrel |
| 2005/0160002 A1 | 7/2005 | Roetter et al. |
| 2005/0160003 A1 | 7/2005 | Berardi et al. |
| 2005/0205666 A1 | 9/2005 | Ward et al. |
| 2005/0210387 A1 | 9/2005 | Alagappan et al. |
| 2005/0216334 A1 | 9/2005 | Mehrabani-Farsi |
| 2005/0216823 A1 | 9/2005 | Petersen et al. |
| 2005/0235310 A1 | 10/2005 | Bies |
| 2005/0240472 A1 | 10/2005 | Postrel |
| 2005/0240474 A1 | 10/2005 | Li |
| 2005/0240478 A1 | 10/2005 | Lubow et al. |
| 2005/0242179 A1 | 11/2005 | Warwick |
| 2005/0251446 A1 | 11/2005 | Jiang et al. |
| 2005/0251469 A1 | 11/2005 | Nandakumar |
| 2005/0267812 A1 | 12/2005 | Jensen et al. |
| 2006/0002189 A1 | 1/2006 | Berkman |
| 2006/0004613 A1 | 1/2006 | Roller et al. |
| 2006/0010033 A1 | 1/2006 | Thomas |
| 2006/0020511 A1 | 1/2006 | Postrel |
| 2006/0041891 A1* | 2/2006 | Aaron ................. G09B 7/00 719/315 |
| 2006/0053056 A1 | 3/2006 | Alspach-Goss et al. |
| 2006/0059040 A1 | 3/2006 | Eldred et al. |
| 2006/0069619 A1 | 3/2006 | Walker et al. |
| 2006/0085260 A1 | 4/2006 | Yamagishi |
| 2006/0085263 A1 | 4/2006 | Greer et al. |
| 2006/0103667 A1 | 5/2006 | Amit et al. |
| 2006/0111967 A1 | 5/2006 | Forbes |
| 2006/0122921 A1 | 6/2006 | Comerford et al. |
| 2006/0129456 A1 | 6/2006 | Walker et al. |
| 2006/0136299 A1 | 6/2006 | Ruhmkorf |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0184419 A1 | 8/2006 | Postrel |
| 2006/0190337 A1 | 8/2006 | Ayers et al. |
| 2006/0206376 A1 | 9/2006 | Gibbs et al. |
| 2006/0206385 A1 | 9/2006 | Walker et al. |
| 2006/0208065 A1 | 9/2006 | Mendelovich et al. |
| 2006/0212900 A1 | 9/2006 | Ismail et al. |
| 2006/0218038 A1 | 9/2006 | Grider |
| 2006/0224454 A1 | 10/2006 | Kantor et al. |
| 2006/0230053 A1 | 10/2006 | Eldering |
| 2006/0235746 A1 | 10/2006 | Hammond et al. |
| 2006/0253320 A1 | 11/2006 | Heywood |
| 2006/0253321 A1 | 11/2006 | Heywood |
| 2006/0253323 A1 | 11/2006 | Phan et al. |
| 2006/0259362 A1 | 11/2006 | Cates |
| 2006/0259364 A1 | 11/2006 | Strock et al. |
| 2006/0261149 A1 | 11/2006 | Raghavendra |
| 2006/0265280 A1 | 11/2006 | Nakada et al. |
| 2006/0265429 A1 | 11/2006 | Pendergast et al. |
| 2006/0277103 A1 | 12/2006 | Fujita et al. |
| 2006/0287916 A1 | 12/2006 | Starr et al. |
| 2006/0287943 A1 | 12/2006 | Postrel |
| 2006/0289631 A1 | 12/2006 | Stretch et al. |
| 2006/0293948 A1 | 12/2006 | Weinblatt |
| 2006/0293959 A1 | 12/2006 | Hogan |
| 2007/0005416 A1 | 1/2007 | Jackson et al. |
| 2007/0011044 A1 | 1/2007 | Hansen |
| 2007/0033104 A1 | 2/2007 | Collins et al. |
| 2007/0038515 A1 | 2/2007 | Postrel |
| 2007/0038516 A1 | 2/2007 | Apple et al. |
| 2007/0043619 A1 | 2/2007 | Leason et al. |
| 2007/0043620 A1 | 2/2007 | Leason et al. |
| 2007/0045405 A1 | 3/2007 | Rothschild |
| 2007/0055597 A1 | 3/2007 | Patel et al. |
| 2007/0061190 A1 | 3/2007 | Wardell |
| 2007/0061256 A1 | 3/2007 | Park et al. |
| 2007/0067267 A1 | 3/2007 | Ives |
| 2007/0067297 A1 | 3/2007 | Kublickis |
| 2007/0078719 A1 | 4/2007 | Schmitt et al. |
| 2007/0084917 A1 | 4/2007 | Fajkowski |
| 2007/0100691 A1 | 5/2007 | Patterson |
| 2007/0106556 A1 | 5/2007 | Edwards et al. |
| 2007/0112629 A1 | 5/2007 | Solomon et al. |
| 2007/0124201 A1 | 5/2007 | Hu et al. |
| 2007/0129955 A1 | 6/2007 | Dalmia et al. |
| 2007/0129963 A1 | 6/2007 | Skibinski et al. |
| 2007/0130011 A1 | 6/2007 | Postrel |
| 2007/0136131 A1 | 6/2007 | Mankoff |
| 2007/0143178 A1 | 6/2007 | Citrin et al. |
| 2007/0156470 A1 | 7/2007 | Granucci et al. |
| 2007/0156517 A1 | 7/2007 | Kaplan et al. |
| 2007/0162377 A1 | 7/2007 | Williams |

(56) References Cited

U.S. PATENT DOCUMENTS

| | | |
|---|---|---|
| 2007/0174295 A1 | 7/2007 | Abraham et al. |
| 2007/0179846 A1 | 8/2007 | Jain et al. |
| 2007/0192121 A1 | 8/2007 | Routson |
| 2007/0192122 A1 | 8/2007 | Routson et al. |
| 2007/0192784 A1 | 8/2007 | Postrel |
| 2007/0198338 A1 | 8/2007 | Heywood |
| 2007/0208671 A1 | 9/2007 | Brown et al. |
| 2007/0214049 A1 | 9/2007 | Postrel |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226059 A1 | 9/2007 | Postrel |
| 2007/0226061 A1 | 9/2007 | Chen et al. |
| 2007/0239521 A1 | 10/2007 | Khadpe et al. |
| 2007/0239532 A1 | 10/2007 | Benson et al. |
| 2007/0241189 A1 | 10/2007 | Slavin et al. |
| 2007/0244741 A1 | 10/2007 | Blume et al. |
| 2007/0260509 A1 | 11/2007 | Hines et al. |
| 2007/0260521 A1 | 11/2007 | Van Der Riet |
| 2007/0260736 A1 | 11/2007 | Miller |
| 2007/0265920 A1 | 11/2007 | Bistriceanu et al. |
| 2007/0265921 A1 | 11/2007 | Rempe et al. |
| 2007/0265923 A1 | 11/2007 | Krassner et al. |
| 2007/0282681 A1 | 12/2007 | Shubert et al. |
| 2007/0288313 A1 | 12/2007 | Brodson et al. |
| 2008/0004884 A1 | 1/2008 | Flake et al. |
| 2008/0010154 A1 | 1/2008 | Tietzen et al. |
| 2008/0011820 A1 | 1/2008 | Brown et al. |
| 2008/0021772 A1 | 1/2008 | Aloni et al. |
| 2008/0021784 A1 | 1/2008 | Hessburg et al. |
| 2008/0021785 A1 | 1/2008 | Hessburg et al. |
| 2008/0027810 A1 | 1/2008 | Lerner et al. |
| 2008/0040222 A1 | 2/2008 | Gee |
| 2008/0040229 A1 | 2/2008 | Gholston |
| 2008/0040270 A1 | 2/2008 | Buchheit et al. |
| 2008/0046358 A1 | 2/2008 | Holm-Blagg et al. |
| 2008/0056541 A1 | 3/2008 | Tani et al. |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1 | 3/2008 | Fordyce, III et al. |
| 2008/0065507 A1 | 3/2008 | Morrison et al. |
| 2008/0071587 A1 | 3/2008 | Granucci et al. |
| 2008/0071640 A1 | 3/2008 | Nguyen |
| 2008/0071680 A1 | 3/2008 | Sheets |
| 2008/0077487 A1 | 3/2008 | Davis et al. |
| 2008/0077499 A1 | 3/2008 | Ariff et al. |
| 2008/0082393 A1 | 4/2008 | Ozzie et al. |
| 2008/0082397 A1 | 4/2008 | Dennison et al. |
| 2008/0082418 A1 | 4/2008 | Fordyce et al. |
| 2008/0103887 A1 | 5/2008 | Oldham et al. |
| 2008/0103888 A1 | 5/2008 | Weir |
| 2008/0103968 A1 | 5/2008 | Bies et al. |
| 2008/0120182 A1 | 5/2008 | Arnold et al. |
| 2008/0120218 A1 | 5/2008 | Reid et al. |
| 2008/0120221 A1 | 5/2008 | Toneguzzo |
| 2008/0126261 A1 | 5/2008 | Lovett |
| 2008/0133345 A1 | 6/2008 | Cordery et al. |
| 2008/0133350 A1 | 6/2008 | White et al. |
| 2008/0133351 A1 | 6/2008 | White et al. |
| 2008/0133366 A1 | 6/2008 | Evans et al. |
| 2008/0134228 A1 | 6/2008 | Dion et al. |
| 2008/0147731 A1 | 6/2008 | Narayana et al. |
| 2008/0154654 A1 | 6/2008 | Niessen et al. |
| 2008/0154676 A1 | 6/2008 | Suk |
| 2008/0154703 A1 | 6/2008 | Flake et al. |
| 2008/0154704 A1 | 6/2008 | Flake et al. |
| 2008/0154722 A1 | 6/2008 | Galinos |
| 2008/0154727 A1 | 6/2008 | Carlson |
| 2008/0162258 A1 | 7/2008 | Kala et al. |
| 2008/0162269 A1 | 7/2008 | Gilbert |
| 2008/0163257 A1 | 7/2008 | Carlson et al. |
| 2008/0167000 A1 | 7/2008 | Wentker et al. |
| 2008/0167961 A1 | 7/2008 | Wentker et al. |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0177627 A1 | 7/2008 | Cefail |
| 2008/0183480 A1 | 7/2008 | Carlson et al. |
| 2008/0184117 A1 | 7/2008 | Alsbury et al. |
| 2008/0195465 A1 | 8/2008 | Redmond et al. |
| 2008/0195473 A1 | 8/2008 | Laramy et al. |
| 2008/0195528 A1 | 8/2008 | Keithley |
| 2008/0201224 A1 | 8/2008 | Owens et al. |
| 2008/0201226 A1 | 8/2008 | Carlson et al. |
| 2008/0201472 A1 | 8/2008 | Bistriceanu et al. |
| 2008/0215429 A1 | 9/2008 | Ramer et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0222038 A1 | 9/2008 | Eden et al. |
| 2008/0228563 A1 | 9/2008 | Zellner et al. |
| 2008/0228582 A1 | 9/2008 | Fordyce et al. |
| 2008/0228583 A1 | 9/2008 | MacDonald et al. |
| 2008/0235091 A1 | 9/2008 | Holliday |
| 2008/0235243 A1 | 9/2008 | Lee et al. |
| 2008/0242317 A1 | 10/2008 | Abhyanker |
| 2008/0248815 A1 | 10/2008 | Busch |
| 2008/0249861 A1 | 10/2008 | Carotta et al. |
| 2008/0255946 A1 | 10/2008 | Altberg et al. |
| 2008/0262915 A1 | 10/2008 | Gojkovic et al. |
| 2008/0275771 A1 | 11/2008 | Levine |
| 2008/0275779 A1 | 11/2008 | Lakshminarayanan |
| 2008/0281668 A1 | 11/2008 | Nurminen |
| 2008/0281699 A1 | 11/2008 | Whitehead |
| 2008/0300973 A1 | 12/2008 | DeWitt et al. |
| 2008/0301037 A1 | 12/2008 | Monk |
| 2008/0301102 A1 | 12/2008 | Liang |
| 2008/0306790 A1 | 12/2008 | Otto et al. |
| 2008/0313011 A1 | 12/2008 | Rose et al. |
| 2008/0313034 A1 | 12/2008 | Wise |
| 2008/0318559 A1 | 12/2008 | Porco |
| 2008/0319843 A1 | 12/2008 | Moser et al. |
| 2008/0319847 A1 | 12/2008 | Shepard |
| 2008/0319889 A1 | 12/2008 | Hammad |
| 2008/0320512 A1 | 12/2008 | Knight |
| 2009/0006183 A1 | 1/2009 | Paintin et al. |
| 2009/0006203 A1 | 1/2009 | Fordyce et al. |
| 2009/0006363 A1 | 1/2009 | Canny et al. |
| 2009/0018895 A1 | 1/2009 | Weinblatt et al. |
| 2009/0018909 A1 | 1/2009 | Grecia |
| 2009/0030793 A1 | 1/2009 | Fordyce, III |
| 2009/0036103 A1 | 2/2009 | Byerley et al. |
| 2009/0043593 A1 | 2/2009 | Herbrich et al. |
| 2009/0043648 A1 | 2/2009 | Mahdian et al. |
| 2009/0048884 A1 | 2/2009 | Olives et al. |
| 2009/0048916 A1 | 2/2009 | Nuzum et al. |
| 2009/0070207 A1 | 3/2009 | Engel et al. |
| 2009/0070219 A1 | 3/2009 | DAngelo et al. |
| 2009/0070225 A1 | 3/2009 | Matz et al. |
| 2009/0076896 A1 | 3/2009 | DeWitt et al. |
| 2009/0076911 A1 | 3/2009 | Vo et al. |
| 2009/0076912 A1 | 3/2009 | Rajan et al. |
| 2009/0076925 A1 | 3/2009 | DeWitt et al. |
| 2009/0081990 A1 | 3/2009 | Granucci et al. |
| 2009/0084842 A1 | 4/2009 | Vriheas et al. |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0125396 A1 | 5/2009 | Otto et al. |
| 2009/0132347 A1 | 5/2009 | Anderson et al. |
| 2009/0132365 A1 | 5/2009 | Gruenhagen et al. |
| 2009/0132366 A1 | 5/2009 | Lam et al. |
| 2009/0132395 A1 | 5/2009 | Lam et al. |
| 2009/0132404 A1 | 5/2009 | King et al. |
| 2009/0144122 A1 | 6/2009 | Ginsberg et al. |
| 2009/0144146 A1 | 6/2009 | Levine et al. |
| 2009/0144201 A1 | 6/2009 | Gierkink et al. |
| 2009/0144205 A1 | 6/2009 | Hurry |

(56) References Cited

U.S. PATENT DOCUMENTS

| | | |
|---|---|---|
| 2009/0150211 A1 | 6/2009 | Bayne |
| 2009/0157511 A1 | 6/2009 | Spinnell et al. |
| 2009/0157512 A1 | 6/2009 | King |
| 2009/0171747 A1 | 7/2009 | Lanning et al. |
| 2009/0171778 A1 | 7/2009 | Powell |
| 2009/0172551 A1 | 7/2009 | Kane et al. |
| 2009/0172728 A1 | 7/2009 | Shkedi et al. |
| 2009/0176580 A1 | 7/2009 | Herrmann et al. |
| 2009/0182634 A1 | 7/2009 | Park et al. |
| 2009/0187462 A1 | 7/2009 | Gevelber et al. |
| 2009/0192882 A1 | 7/2009 | Narahashi et al. |
| 2009/0198572 A1 | 8/2009 | Jurgens |
| 2009/0203387 A1 | 8/2009 | Wold et al. |
| 2009/0204472 A1 | 8/2009 | Einhorn |
| 2009/0216579 A1 | 8/2009 | Zen et al. |
| 2009/0216606 A1 | 8/2009 | Coffman et al. |
| 2009/0216616 A1 | 8/2009 | Wang et al. |
| 2009/0222323 A1 | 9/2009 | Kelly et al. |
| 2009/0222348 A1 | 9/2009 | Ransom et al. |
| 2009/0234708 A1 | 9/2009 | Heiser, II et al. |
| 2009/0234711 A1 | 9/2009 | Ramer et al. |
| 2009/0234715 A1 | 9/2009 | Heiser, II et al. |
| 2009/0234722 A1 | 9/2009 | Evevsky |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0254476 A1 | 10/2009 | Sharma et al. |
| 2009/0259518 A1 | 10/2009 | Harvey et al. |
| 2009/0271262 A1 | 10/2009 | Hammad |
| 2009/0271275 A1 | 10/2009 | Regmi et al. |
| 2009/0271305 A1 | 10/2009 | Lal et al. |
| 2009/0271327 A1 | 10/2009 | Lal et al. |
| 2009/0276304 A1 | 11/2009 | Dorr |
| 2009/0276317 A1 | 11/2009 | Dixon et al. |
| 2009/0299846 A1 | 12/2009 | Brueggemann et al. |
| 2009/0299941 A1 | 12/2009 | McColgan et al. |
| 2009/0300490 A1 | 12/2009 | Lejano et al. |
| 2009/0307118 A1 | 12/2009 | Baumgartner, IV |
| 2009/0307130 A1 | 12/2009 | Tan |
| 2009/0319638 A1 | 12/2009 | Faith et al. |
| 2009/0327151 A1 | 12/2009 | Carlson et al. |
| 2009/0327892 A1 | 12/2009 | Douillet et al. |
| 2010/0010888 A1 | 1/2010 | Maertz |
| 2010/0017275 A1 | 1/2010 | Carlson et al. |
| 2010/0030644 A1 | 2/2010 | Dhamodharan |
| 2010/0030688 A1 | 2/2010 | Patterson |
| 2010/0042517 A1 | 2/2010 | Paintin et al. |
| 2010/0049588 A1 | 2/2010 | Debow |
| 2010/0049620 A1 | 2/2010 | Debow |
| 2010/0057549 A1 | 3/2010 | Boal |
| 2010/0057551 A1 | 3/2010 | Blaisdell |
| 2010/0057553 A1 | 3/2010 | Ameiss et al. |
| 2010/0057586 A1 | 3/2010 | Chow |
| 2010/0075638 A1 | 3/2010 | Carlson et al. |
| 2010/0076820 A1 | 3/2010 | Davis |
| 2010/0082420 A1 | 4/2010 | Trifiletti et al. |
| 2010/0088176 A1 | 4/2010 | Jacoves et al. |
| 2010/0094694 A1 | 4/2010 | Shapiro |
| 2010/0106568 A1 | 4/2010 | Grimes |
| 2010/0106569 A1 | 4/2010 | Grimes |
| 2010/0106570 A1 | 4/2010 | Radu et al. |
| 2010/0106589 A1 | 4/2010 | Etheredge et al. |
| 2010/0106598 A1 | 4/2010 | Grimes |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0121726 A1 | 5/2010 | Coulter et al. |
| 2010/0121727 A1 | 5/2010 | Butler |
| 2010/0121767 A1 | 5/2010 | Coulter et al. |
| 2010/0125490 A1 | 5/2010 | Kiciman et al. |
| 2010/0125737 A1 | 5/2010 | Kang |
| 2010/0131415 A1 | 5/2010 | Sartipi |
| 2010/0138838 A1 | 6/2010 | Lin et al. |
| 2010/0145786 A1 | 6/2010 | Fordyce, III et al. |
| 2010/0145855 A1 | 6/2010 | Fordyce, III et al. |
| 2010/0153242 A1 | 6/2010 | Preston et al. |
| 2010/0161379 A1 | 6/2010 | Bene et al. |
| 2010/0161404 A1 | 6/2010 | Taylor et al. |
| 2010/0161457 A1 | 6/2010 | Katz et al. |
| 2010/0174596 A1 | 7/2010 | Gilman et al. |
| 2010/0174607 A1 | 7/2010 | Henkin et al. |
| 2010/0174623 A1 | 7/2010 | Mcphie et al. |
| 2010/0191594 A1 | 7/2010 | White et al. |
| 2010/0211445 A1 | 8/2010 | Bodington |
| 2010/0211469 A1 | 8/2010 | Salmon et al. |
| 2010/0211694 A1 | 8/2010 | Razmov et al. |
| 2010/0250338 A1 | 9/2010 | Banerjee et al. |
| 2010/0250357 A1 | 9/2010 | Kim |
| 2010/0274566 A1 | 10/2010 | Carlson |
| 2010/0274625 A1 | 10/2010 | Carlson |
| 2010/0274627 A1 | 10/2010 | Carlson |
| 2010/0274653 A1 | 10/2010 | Hammad |
| 2010/0274659 A1 | 10/2010 | Antonucci et al. |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280892 A1 | 11/2010 | Uzunalioglu et al. |
| 2010/0280914 A1 | 11/2010 | Carlson |
| 2010/0280927 A1 | 11/2010 | Faith et al. |
| 2010/0280950 A1 | 11/2010 | Faith et al. |
| 2010/0299194 A1 | 11/2010 | Snyder et al. |
| 2010/0304227 A1 | 12/2010 | Kah et al. |
| 2010/0306029 A1 | 12/2010 | Jolley |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2010/0325047 A1 | 12/2010 | Carlson et al. |
| 2010/0325048 A1 | 12/2010 | Carlson et al. |
| 2011/0016103 A1 | 1/2011 | Sivakumar et al. |
| 2011/0022424 A1 | 1/2011 | VonDerheide |
| 2011/0022448 A1 | 1/2011 | Strock et al. |
| 2011/0022514 A1 | 1/2011 | Lal et al. |
| 2011/0029363 A1 | 2/2011 | Gillenson et al. |
| 2011/0035278 A1 | 2/2011 | Fordyce, III et al. |
| 2011/0035280 A1 | 2/2011 | Fordyce, III et al. |
| 2011/0035288 A1 | 2/2011 | Clyne |
| 2011/0047019 A1 | 2/2011 | Cervenka et al. |
| 2011/0047072 A1 | 2/2011 | Ciurea |
| 2011/0054981 A1 | 3/2011 | Faith et al. |
| 2011/0066483 A1 | 3/2011 | Salmon et al. |
| 2011/0066484 A1 | 3/2011 | Cha et al. |
| 2011/0082739 A1 | 4/2011 | Pourfallah |
| 2011/0087519 A1 | 4/2011 | Fordyce, III et al. |
| 2011/0087530 A1 | 4/2011 | Fordyce, III et al. |
| 2011/0087531 A1 | 4/2011 | Winters et al. |
| 2011/0087546 A1 | 4/2011 | Fordyce, III et al. |
| 2011/0087547 A1 | 4/2011 | Amaro et al. |
| 2011/0087550 A1 | 4/2011 | Fordyce, III et al. |
| 2011/0093324 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0106607 A1 | 5/2011 | Alfonso et al. |
| 2011/0106840 A1 | 5/2011 | Barrett et al. |
| 2011/0125509 A1 | 5/2011 | Lidstrom et al. |
| 2011/0125565 A1 | 5/2011 | MacIlwaine et al. |
| 2011/0131135 A1 | 6/2011 | Carlson et al. |
| 2011/0145148 A1 | 6/2011 | Hammad |
| 2011/0161230 A1 | 6/2011 | Singh |
| 2011/0208575 A1 | 8/2011 | Bansal et al. |
| 2011/0218868 A1 | 9/2011 | Young et al. |
| 2011/0225586 A1 | 9/2011 | Bentley et al. |
| 2011/0231235 A1 | 9/2011 | MacIlwaine et al. |
| 2011/0231258 A1 | 9/2011 | Winters |
| 2011/0238483 A1 | 9/2011 | Yoo et al. |
| 2011/0270719 A1 | 11/2011 | Hollars et al. |
| 2011/0276383 A1 | 11/2011 | Heiser et al. |
| 2011/0276493 A1 | 11/2011 | Graham et al. |

(56) References Cited

U.S. PATENT DOCUMENTS

| | | |
|---|---|---|
| 2011/0276495 A1 | 11/2011 | Varadarajan et al. |
| 2011/0288906 A1 | 11/2011 | Thomas et al. |
| 2011/0288918 A1 | 11/2011 | Cervenka et al. |
| 2011/0288922 A1 | 11/2011 | Thomas et al. |
| 2011/0288924 A1 | 11/2011 | Thomas et al. |
| 2011/0288925 A1 | 11/2011 | Thomas et al. |
| 2011/0295670 A1 | 12/2011 | Thomas et al. |
| 2011/0295671 A1 | 12/2011 | Thomas et al. |
| 2011/0295675 A1 | 12/2011 | Reodica |
| 2011/0302011 A1 | 12/2011 | Yoder et al. |
| 2011/0302022 A1 | 12/2011 | Fordyce, III et al. |
| 2011/0302036 A1 | 12/2011 | Fordyce, III et al. |
| 2011/0302039 A1 | 12/2011 | Fordyce, III et al. |
| 2011/0307318 A1 | 12/2011 | LaPorte et al. |
| 2012/0010940 A1 | 1/2012 | Masi |
| 2012/0016728 A1 | 1/2012 | Ahmad et al. |
| 2012/0035998 A1 | 2/2012 | Chien et al. |
| 2012/0041808 A1 | 2/2012 | Hofer et al. |
| 2012/0041812 A1 | 2/2012 | Postrel |
| 2012/0059702 A1 | 3/2012 | Yoder et al. |
| 2012/0066062 A1 | 3/2012 | Yoder et al. |
| 2012/0066064 A1 | 3/2012 | Yoder et al. |
| 2012/0072997 A1 | 3/2012 | Carlson et al. |
| 2012/0078697 A1 | 3/2012 | Carlson et al. |
| 2012/0078699 A1 | 3/2012 | Carlson et al. |
| 2012/0101881 A1 | 4/2012 | Taylor et al. |
| 2012/0101894 A1 | 4/2012 | Sterling et al. |
| 2012/0109709 A1 | 5/2012 | Fordyce, III et al. |
| 2012/0109730 A1 | 5/2012 | Yoder et al. |
| 2012/0109734 A1 | 5/2012 | Fordyce, III et al. |
| 2012/0123849 A1 | 5/2012 | Armstrong |
| 2012/0130859 A1 | 5/2012 | Wolfe et al. |
| 2012/0136704 A1 | 5/2012 | Carlson et al. |
| 2012/0150601 A1 | 6/2012 | Fisher |
| 2012/0150609 A1 | 6/2012 | Walker et al. |
| 2012/0179531 A1 | 7/2012 | Kim |
| 2012/0185315 A1 | 7/2012 | VonDerheide et al. |
| 2012/0191521 A1 | 7/2012 | Kumawat |
| 2012/0191525 A1 | 7/2012 | Singh et al. |
| 2012/0215610 A1 | 8/2012 | Amaro et al. |
| 2012/0215614 A1 | 8/2012 | Hochstatter et al. |
| 2012/0215624 A1 | 8/2012 | Ramer et al. |
| 2012/0215637 A1 | 8/2012 | Hermann |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0239477 A1 | 9/2012 | Cueli et al. |
| 2012/0239498 A1 | 9/2012 | Ramer et al. |
| 2012/0244948 A1 | 9/2012 | Dhillon et al. |
| 2012/0245987 A1 | 9/2012 | Isaacson et al. |
| 2012/0259695 A1 | 10/2012 | Glassman et al. |
| 2012/0259842 A1 | 10/2012 | Oman et al. |
| 2012/0267432 A1 | 10/2012 | Kuttuva |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0271706 A1 | 10/2012 | Ransom et al. |
| 2012/0278173 A1 | 11/2012 | Vaidyanathan et al. |
| 2012/0290950 A1 | 11/2012 | Rapaport et al. |
| 2012/0303425 A1 | 11/2012 | Katzin et al. |
| 2012/0310838 A1 | 12/2012 | Harris et al. |
| 2012/0316945 A1 | 12/2012 | Wolf et al. |
| 2012/0323663 A1 | 12/2012 | Leach |
| 2012/0323664 A1 | 12/2012 | Klems |
| 2013/0006709 A1 | 1/2013 | Kosta |
| 2013/0006848 A1 | 1/2013 | Kuttuva |
| 2013/0046610 A1 | 2/2013 | Abraham |
| 2013/0060679 A1 | 3/2013 | Oskolkov et al. |
| 2013/0080237 A1 | 3/2013 | Hart |
| 2013/0091000 A1 | 4/2013 | Hagey et al. |
| 2013/0124287 A1 | 5/2013 | Bjorn et al. |
| 2013/0132205 A1 | 5/2013 | Harris |
| 2013/0132283 A1 | 5/2013 | Hayhow et al. |
| 2013/0151401 A1 | 6/2013 | Scipioni et al. |
| 2013/0173364 A1 | 7/2013 | Choong Cheng Shien et al. |
| 2013/0216109 A1 | 8/2013 | Ishikawa et al. |
| 2013/0226805 A1 | 8/2013 | Griffin et al. |
| 2013/0246150 A1 | 9/2013 | Ovick et al. |
| 2013/0282586 A1 | 10/2013 | Ovick et al. |
| 2014/0012697 A1 | 1/2014 | Rachlyn et al. |
| 2014/0074575 A1 | 3/2014 | Rappoport |
| 2014/0081720 A1 | 3/2014 | Wu |
| 2014/0236692 A1* | 8/2014 | Nordstrand ........ G06Q 30/0219 705/14.23 |
| 2014/0310086 A1 | 10/2014 | Fordyce et al. |
| 2015/0039485 A1* | 2/2015 | Egenolf ................ G06Q 40/04 705/37 |
| 2016/0358197 A1 | 12/2016 | Ovick et al. |

FOREIGN PATENT DOCUMENTS

| | | |
|---|---|---|
| JP | 2000357204 A | 12/2000 |
| JP | 2001501328 A | 1/2001 |
| JP | 2001175761 A | 6/2001 |
| JP | 2003502763 A | 1/2003 |
| JP | 2003108897 A | 4/2003 |
| JP | 2004303015 A | 10/2004 |
| JP | 2006301866 A | 11/2006 |
| JP | 2007102340 A | 4/2007 |
| JP | 2007317209 A | 12/2007 |
| JP | 2009501891 A | 1/2009 |
| KR | 20010083521 A | 9/2001 |
| KR | 20010096672 A | 11/2001 |
| KR | 20010096673 A | 11/2001 |
| KR | 20020002817 A | 1/2002 |
| KR | 20020050219 A | 6/2002 |
| KR | 20020074271 A | 9/2002 |
| KR | 20030008894 A | 1/2003 |
| KR | 20030080111 A | 10/2003 |
| KR | 20030080797 A | 10/2003 |
| KR | 1020040016771 A | 2/2004 |
| KR | 1020040028110 A | 4/2004 |
| KR | 1020040040253 A | 5/2004 |
| KR | 1020040045622 A | 6/2004 |
| KR | 1020040077077 A | 9/2004 |
| KR | 1020040107715 A | 12/2004 |
| KR | 1020050024746 A | 3/2005 |
| KR | 1020050061661 A | 6/2005 |
| KR | 1020050078135 A | 8/2005 |
| KR | 1020050089523 A | 9/2005 |
| KR | 1020050113156 A | 12/2005 |
| KR | 1020060034983 A | 4/2006 |
| KR | 1020060095895 A | 9/2006 |
| KR | 1020060101241 A | 9/2006 |
| KR | 1020070030415 A | 3/2007 |
| KR | 1020070043329 A | 4/2007 |
| KR | 100717590 B1 | 5/2007 |
| KR | 1020070070588 A | 7/2007 |
| KR | 1020070075986 A | 7/2007 |
| KR | 1020070088955 A | 8/2007 |
| KR | 100761398 B1 | 9/2007 |
| KR | 1020070110241 A | 11/2007 |
| KR | 1020080002731 A | 1/2008 |
| KR | 100836484 B1 | 6/2008 |
| KR | 1020080102439 A | 11/2008 |
| KR | 1020080104398 A | 12/2008 |
| KR | 100883700 B1 | 2/2009 |
| KR | 1020090016353 A | 2/2009 |
| KR | 1020090059922 A | 6/2009 |
| MX | PA01013136 A | 6/2004 |
| WO | 1999022328 A1 | 5/1999 |
| WO | 1999026176 A1 | 5/1999 |
| WO | 1999050775 A1 | 10/1999 |
| WO | 2000003328 A1 | 1/2000 |
| WO | 2000060435 A2 | 10/2000 |
| WO | 2000062231 A1 | 10/2000 |
| WO | 2000079461 A1 | 12/2000 |
| WO | 2001037183 A1 | 5/2001 |
| WO | 2001039023 A2 | 5/2001 |
| WO | 2001057758 A1 | 8/2001 |
| WO | 2001086378 A2 | 11/2001 |
| WO | 2001093161 A1 | 12/2001 |
| WO | 2002005116 A2 | 1/2002 |

(56) References Cited

FOREIGN PATENT DOCUMENTS

| | | | |
|---|---|---|---|
| WO | 2002014985 A2 | 2/2002 | |
| WO | 2002019229 A2 | 3/2002 | |
| WO | 2002042970 A1 | 5/2002 | |
| WO | 2002071187 A2 | 9/2002 | |
| WO | 2003025695 A2 | 3/2003 | |
| WO | 2003043333 A1 | 5/2003 | |
| WO | 2003081376 A2 | 10/2003 | |
| WO | 2005001631 A2 | 1/2005 | |
| WO | 2005031513 A2 | 4/2005 | |
| WO | 2005072382 A2 | 8/2005 | |
| WO | 2005076181 A1 | 8/2005 | |
| WO | 2006028739 A2 | 3/2006 | |
| WO | 2006121541 A1 | 11/2006 | |
| WO | 2006126205 A2 | 11/2006 | |
| WO | 2007131258 A1 | 11/2007 | |
| WO | 2007136221 A1 | 11/2007 | |
| WO | 2008013945 A2 | 1/2008 | |
| WO | 2008016923 A2 | 2/2008 | |
| WO | 2008023912 A2 | 2/2008 | |
| WO | 2008028154 A1 | 3/2008 | |
| WO | 2008052073 A2 | 5/2008 | |
| WO | 2008055217 A2 | 5/2008 | |
| WO | 2008064343 A1 | 5/2008 | |
| WO | 2008144643 A1 | 11/2008 | |
| WO | 2009144010 A1 | 12/2009 | |
| WO | 2010017247 A2 | 2/2010 | |
| WO | 2010036915 A2 | 4/2010 | |
| WO | 2010093893 A2 | 8/2010 | |
| WO | 2010135642 A2 | 11/2010 | |
| WO | 2010141270 A2 | 12/2010 | |
| WO | 2011017613 A2 | 2/2011 | |
| WO | 2011044137 A2 | 4/2011 | |
| WO | 2012040270 A2 | 3/2012 | |
| WO | 2012061758 A2 | 5/2012 | |
| WO | 2013138756 A1 | 9/2013 | |
| ZA | 200200475 A | 6/2003 | |

OTHER PUBLICATIONS

Bump, General FAQ's, Feb. 8, 2011.
Business Editors, "CardSelect International Prepares for Launch of Customized Loyalty Platform for Credit Cards", Business Wire, Apr. 5, 2001, 2 pages.
"Car rebate credit cards", CreditCardGuide.com, 2009, 2 pages, retrieved at http://www.creditcardguide.com/car-rebate.html/.
Carini, "Oracle's Complete Sell-Side E-commerce Solution", Apr. 30, 2008, 20 pages, available at http://www.oracle.com/us/products/applications/siebel/self-service-ebilling/038547.pdf.
"Cash Back Credit Cards", CreditCardGuide.com, 2009, 2 pages, retrieved at http://www.creditcardguide.com/cashback2.html/.
"Cash Back Reward Credit Cards", Credit Card Finder, 2009, 3 pages, retrieved at http://www.plasticrewards.com/creditcard/cash-back-reward/.
Cashmore, "YouTube Ads: YouHate Em", Apr. 5, 2009, available at htlp://mashable.com/2009/04/05/youtube-ads-youhate- em/#.
Comer, "The Ubiquitous B-Tree", ACM Computing Surveys, 1979, pp. 121-138, vol. 11, No. 2.
"Compare Cash Back Credit Cards and Credit Card Offers", Credit Card Finder, 2009, 1 page, retrieved at http://www.plasticrewards.com/.
"Dining and entertainment credit cards", CreditCardGuide.com, 2009, 3 pages, retrieved at http://www.creditcardguide.com/dining-entertainment.html/.
"Financial reward credit cards", CreditCardGuide.com, 2009, 2 pages, retrieved at http://www.creditcardguide.com/financial-reward-credit-cards.html/.
"Foundation and charity credit cards", CreditCardGuide.com, 2009, 3 pages, retrieved at http://www.creditcardguide.com/foundations-charities.html/.
"Gas Rebate Credit Cards", CreditCardGuide.com, 2009, 2 pages, retrieved at http://www.creditcardguide.com/gascards.html/.
"Gas Reward Credit Cards", Credit Card Finder, 2009, 3 pages, retrieved at http://www.plasticrewards.com/creditcard/gas-reward/.
Georgiadis et al., "Smart data, smart decisions, smart profits: the retailer's advantage", Feb. 8, 2005, 22 pages, retrieved at http://web.archive.org/web/20050208141921/hrtp://www.mckinsey.com/practices/retail/knowledge/articles/martdalasmartdecisions.pdf.
"Google ad words Tracking Codes-Measuring Your Profits, AdWords Help", Google Corporation—Book Excerpt, 2011, 2 pages, retrieved from http://adwords.google.com/supportlawlbin/answer.py?hl=en&answer=146309.
"Hotel Reward Credit Cards", Credit Card Finder, 2009, 2 pages, retrieved at http://www.plasticrewards.com/credit-card/hotel-reward/.
Li, "Knowledge Gathering and Matching in Heterogeneous Databases", Working Notes of the AAAI Spring Symposium on Information Gathering, Mar. 27, 1995, pp. 116-121.
"Loyalty Solutions—Issuing Rewards Services", First Data Corporation, 2008, Available at http://www.firstdata.com/downloads/marketing-fs/fd_issuingrewards_ss.pdf.
Mielikainen, "Privacy Problems with Anonymized Transaction Databases," 7th International Conference on Discovery Science, 2004, pp. 219-229.
"Operating Rules Women, Infants and Children (WIG) Electronic Benefits Transfer (EBT)", Dec. 21, 2010, USDA Food & Nutrition Service.
Perez, "Pay Pal on Android Leis You Bump Phones to Send Money", Readwrite, Aug. 6, 2010, retrieved at https://readwrite.com/2010/08/06/paypal_ on_ android lets you_ bump phones_ to_ send_ money/.
Punj et al., "Cluster Analysis in Marketing Research: Review and Suggestions for Application," Journal of Marketing Research, 1983, pp. 134-148, vol. 20, No. 2.
"Reward Credit Cards", Credit Card Finder, 2009, 3 pages, retrieved at http://www.plasticrewards.com/credit-card/reward/.
"Scotiabank Announces Its First All-in-One Card: Integrating Smart Chip Technologies' Loyalty with Credit, Debit, and Micropayments on a Single Smart Card", PR Newswire, Jul. 31, 2001.
Shermach, "Coalition Loyalty Programs: Finding Strength in Numbers", Card Marketing, 2001, 4 pages.
"Sports and outdoor enthusiast credit cards", CreditCardGuide.com, 2009, 2 pages, retrieved at http://www.creditcardguide.com/sports-outdoors.html/.
"Travel Reward Credit Cards", Credit Card Finder, 2009, 3 pages, retrieved at http://www.plasticrewards.com/credit-card/travel-reward.
"Use Cash Back Credit Cards", CreditCardGuide.com, 2009, 3 pages, retrieved at http://www.creditcardguide.com/cashback.html/.
"Use home improvement reward credit cards", CreditCardGuide.com, 2009, 2 pages, retrieved at http://www.creditcardguide.com/home- improvement-credit-cards.html/.
"Use hotel reward credit cards and travel reward credit cards", CreditCardGuide.com, 2009, 2 pages, retrieved at http://www.creditcardguide.com/hotel-reward-credit-cards.html/.
"Use retail reward credit cards and brand name reward credit cards", CreditCardGuide.com, 2009, 2 pages, retrieved at http//www.creditcardguide.com/retail-brand-credit-cards.html/.
"Use Reward Credit Cards", CreditCardGuide.com, 2009, 3 pages, retrieved at http://www.creditcardguide.com/reward-point-credit-cards.html/.
"Using Data Mining Techniques for Fraud Detection", Solving Business Problems Using SAS® Enterprise Miner™ Software, 1999, pp. 1-26.
Van Grove, "Are Your Online Video Ads Driving Actual Offline Purchases?", May 18, 2009, available at http://mashable.com/2009/05/18/video-impacl/#.
Warren "Now You Can Bump iPhones to Connect on Facebook, Twitter and LinkedIn", Mashable, Jul. 26, 2010.
WIC EBT Imp Guide, Oct. 22, 2010.
"With Airline Credit Cards, Frequent Flyer credit cards, and Travel Reward Credit Cards", CreditCardGuide.com, 2009, 4 pages, retrieved at http:// www.creditcardguide.com/airline-frequent-flyer-cards.html/.

\* cited by examiner

SYSTEMS AND METHODS TO ORGANIZE AND CONSOLIDATE DATA FOR IMPROVED DATA STORAGE AND PROCESSING

CROSS-REFERENCE TO RELATED APPLICATIONS

The present application is a continuation of U.S. patent application Ser. No. 16/434,271, filed Jun. 7, 2019, which is a continuation of U.S. patent application Ser. No. 14/712,669, filed May 14, 2015, now U.S. Pat. No. 10,354,268, which claims the benefit of U.S. Provisional Patent Application No. 61/994,004, filed May 15, 2014, the disclosures of each of which are hereby incorporated by reference in their entireties.

The present application relates to U.S. patent application Ser. No. 13/648,849, filed Oct. 10, 2012, published as U.S. Pat. App. Pub. No. 2013/0091000, and entitled "Systems and Methods to Provide Discount at Point of Sales Terminals", U.S. patent application Ser. No. 13/676,535, filed Nov. 14, 2012, published as U.S. Pat. App. Pub. No. 2013/0124287, and entitled "Systems and Methods to Provide Discount at Point of Sales Terminals", U.S. patent application Ser. No. 13/804,435, filed Mar. 14, 2013, published as U.S. Pat. Pub. No. 2013/0246150, and entitled "Systems and Methods to Apply the Benefit of Offers via a Transaction Handler", U.S. patent application Ser. No. 12/896,632, filed Oct. 1, 2010, published as U.S. Pat. App. Pub. No. 2011/0087530, and entitled "Systems and Methods to Provide Loyalty Programs," U.S. patent application Ser. No. 13/152,186, filed Jun. 2, 2011, issued as U.S. Pat. No. 8,359,274, and entitled "Systems and Methods to Provide Messages in Real-Time with Transaction Processing," U.S. patent application Ser. No. 13/237,457, filed Sep. 20, 2011, published as 2012/0078697, and entitled "Systems and Methods to Program Operations for Interaction with Users," and U.S. patent application Ser. No. 13/237,467, filed Sep. 20, 2011, published as 2012/0072997, and entitled "Systems and Methods to Modify Interaction Rules during Run Time," the entire disclosures of which applications are hereby incorporated herein by reference.

FIELD OF THE TECHNOLOGY

At least some embodiments of the present disclosure relate to the organization of data for real time processing in an electronic processing network.

BACKGROUND

U.S. Pat. No. 8,359,274 discloses an electronic processing system that is configured to process transactions, identify transactions relevant to offers, and provide messages related to the offers in real-time with the processing of the transactions in an electronic processing network.

U.S. Pat. App. Pub. No. 2012/0078697 discloses a way to program the processing of offer campaigns via data records of anticipated events of predetermined types, linked by pre-requisite conditions such that when the anticipated events are detected in a sequence corresponding to data records linked by the pre-requisite conditions, actions specified in the data records are performed for the offer campaigns, including the transmission of real-time messages in connection with the processing of the relevant transactions in an electronic processing network.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

It is a challenge to optimize the performance of an electronic processing system that is configured to process both transactions and offers in real time, especially in an electronic processing network that is tasked to process a huge amount of transactions in real time while there is a demand to accommodate a rapidly increasing number of offers.

One embodiment disclosed herein dynamically combines offer data records in accordance with predetermined rules such that the data records that are required to be monitored for processing are reduced and the computation efficiency in processing the transactions and relevant offers is improved.

Figure 1:
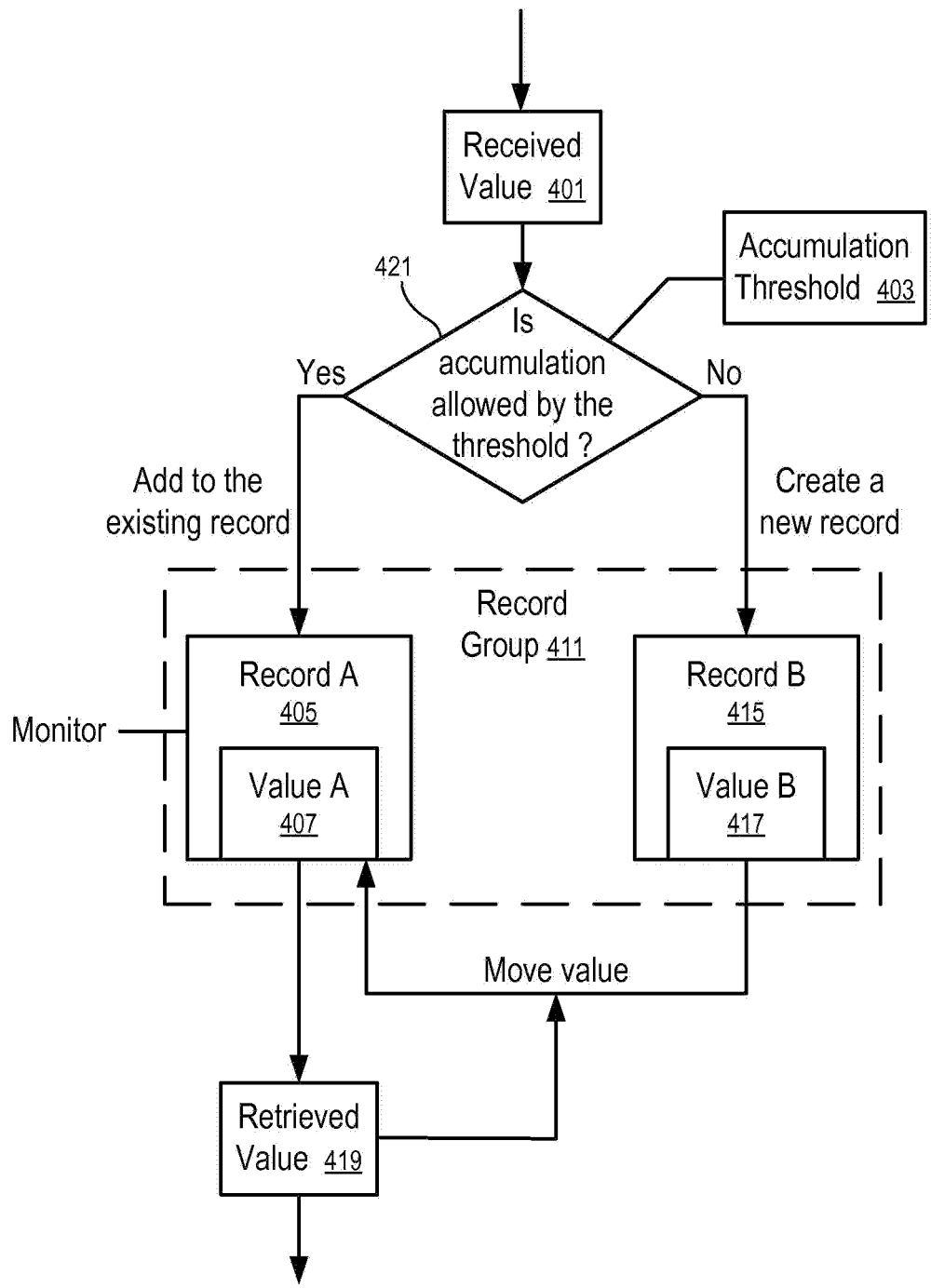
FIG. 1 shows a data processing system to organize and consolidate data for improved data storage and processing according to one embodiment.

FIG. 1 shows a data processing system to organize and consolidate data for improved data storage and processing according to one embodiment.

In FIG. 1, the system is configured to track values (e.g., 401) that are added to a user account and track values (e.g., 419) that are retrieved from the user account in response to relevant transactions.

For example, in response to a relevant transaction in the user account that satisfies a predetermined set of conditions, a value (401) may be added to the user account. For example, in response to another relevant transaction in the user account that satisfies another predetermined set of conditions, another value (419) may be retrieved from the user account for application towards the transaction. The system is configured to monitor the transactions to detect the an applicable record (e.g., 407) and a relevant transaction such that at least a portion of the value (407) identified in the record (407) can be retrieved and applied to the corresponding relevant transaction.

In FIG. 1, the system is configured to maintain at most one active record (405) that is being monitored for the detection of a transaction that qualifies to retrieve at least a portion of the value from the record (405). When the user account has no retrievable value, there is no record maintained for the user account in one embodiment.

In FIG. 1, the system is configured with an accumulation threshold (403). When a received value (401) is to be added to the user account, the system identifies a currently record (405) that has a value lower than the threshold (403) and determines (421) if the received value (401) can be added to the existing record (405) in accordance with the accumulation threshold (403).

For example, when the sum of the existing value (407) of the record (405) and the received value (401) is no more than the accumulation threshold (403), the received value (401) is added to the record (405) such that the value (407) of the record (405) is updated to be equal to the sum.

In one embodiment, when the sum of the existing value (407) of the record (405) and the received value (401) exceeds the accumulation threshold (403), a portion of the received value (401) is added to the record (405) to bring the value (407) to the accumulation threshold (403), and the remaining portion of the received value (401) is used to create a new record (415) having the value (417).

In FIG. 1, the records (405 and 415) are organized as a record group (411) corresponding to the same set of conditions for the detection of qualified transactions for value retrieval. In response to a relevant transaction, a portion or the entire value (407) of the active record (405) can be retrieved and applied to the relevant transaction.

The system is configured to maintain records such that at most one of the records has a value (e.g., 417) that is lower than the accumulation threshold (403). Thus, in response to the received value (401), the system is configured to use the received value to bring the value (417) of the record (415) that is lower than the accumulation threshold (403) up to the accumulation threshold (403) and create a new record for the remaining portion of the received value (401), if there is a remaining portion of the received value (401) to be added to the user account.

When there is more than one record in the record group (411), the system is configured to monitor a record that has the value (407) equal to the accumulation threshold (403). Thus, only one record in the group (411) is active.

In some embodiments, the record group (411) includes at most two records (405 and 415). When there are two records (405 and 415), a record (405) having the value (407) equals to the accumulation threshold (403) is actively being monitored for the detection of a relevant transaction, and the other record (415) is configured to hold the remaining value added to the user account, which may have a value (417) above or below the threshold (403). Such an embodiment further optimizes the data storage for the system.

In one embodiment, for each transaction in the user account, the system determines if a set of predetermined conditions are all satisfied by the transaction; and if so, at least a portion of the value (407) can be retrieved from the record (405) and applied to the transaction.

In FIG. 1, in response to the retrieved value (419) being deducted from the record (405), the system is configured to move at least a portion of the value (417) from the record (415) in the group (411) to bring the value (407) of the record (415) up to the accumulation threshold (403).

For example, when the record group (411) includes two records (405 and 415), a portion of the value (417) of the inactive record (415) can be moved to the record (405) to bring up the value (407) up to the threshold (403). When the value (417) of the record (415) is reduced to zero, the record (415) can be deleted.

In some embodiments, when the record group (411) includes more than two records (405 and 415), at least a portion of the value (417) of the inactive record (415) that has a value (417) lower than the threshold (403) is first moved to the record (405) to bring up the value (407) up to the threshold (403). When the value (417) of the record (415) is reduced to zero, the record (415) can be deleted. If the value (407) of the record (405) is still lower than the threshold (403), a portion of the value from another record can be moved to the record (405). Thus, after the completion of the move operation, there is at most one record (415) having a value lower than the threshold (403); and other records have values equal to the threshold (403).

In some embodiments, when the record group (411) includes more than two records (405 and 415), the system is configured to select another record having a value equal to the threshold (403) as the active record for monitoring and then schedule the operations to combine records having values lower than the thresholds in a background process.

The techniques discussed above improves the real time processing performance of monitoring transactions in view of active records (e.g., 405) to detect a qualified transaction that meets the requirements of a monitored record (e.g., 405) and the applicable record (e.g., 405) from which at least a portion of the value (407) can be retrieved for application towards the transaction, especially when the operations to combine records are scheduled to be performed in a background process.

FIG. 1 illustrates an example of a group (411) of records (405, 415) that have the same set of requirements for a transaction to be qualified to retrieve values from the records. In general, a user account may include multiple groups of records, where different record groups have different qualification requirements for transactions.

The techniques discussed above can be used for discount aggregation, which allows an offer to specify a threshold for maximum discounts that can be redeemed in one transaction. For example, an offer may allow only one discount to be redeemed at a time, or more than one discount to be redeemed in one transaction. The system and method further allow an offer to provide partial discount redemption. After partial discount redemption, data is stored to indicate the remainder amount of the partially redeemed discount so that the user may redeem the unclaimed portion of the discount in a subsequent payment transaction.

For example, a system and method is configured in one embodiment to process multiple discounts earned from the same offer campaign and/or partial redemption of a discount offer. The system and method stores information to allow the modification of the offer benefit based on transaction history of one or more payment accounts linked to the offer, such as modifications based on transactions that earn discounts in accordance with the offer and transactions that partially redeem discounts provided by the offer. The information may include a field identifying the maximum number of discounts that can be combined for redemption via a single transaction.

For example, when an offer provides a $5 discount for each qualified transaction, with a limit of up to 2 discounts redeemable in a single transaction, the system generates a first record to provide $5 discount in response to the detection of a first qualified transaction. When a second qualified transaction is detected, the first record is updated to show $10 discount, instead of generating a second record. When a third qualified transaction is detected, a second record providing $5 discount is generated and queued after the first record. When a redeeming transaction qualifies only for a $7 discount, the benefit identified in the first record is updated to $3 (=$10−$7), which may be combined with the second record, resulting in a combined discount amount of $8 (=$5+$3). Thus, the efficiency of the system is improved in providing the capability of aggregating discounts and/or partial redemption.

In one embodiment, a discount manager (217) is configured to keep track of the multiple discounts, and stack the remainder amount for each discount per user. The enhancement allows the aggregation of amount discounts, percentage discounts, per unit discounts, etc.

In one embodiment, the discount manager (217) allows an offer to indicate whether or not to honor the remainder amount of a partially redeemed discount. If honored, the system allows the user to redeem remainder amount of a partially redeemed discount in a subsequent transaction.

Figure 2:
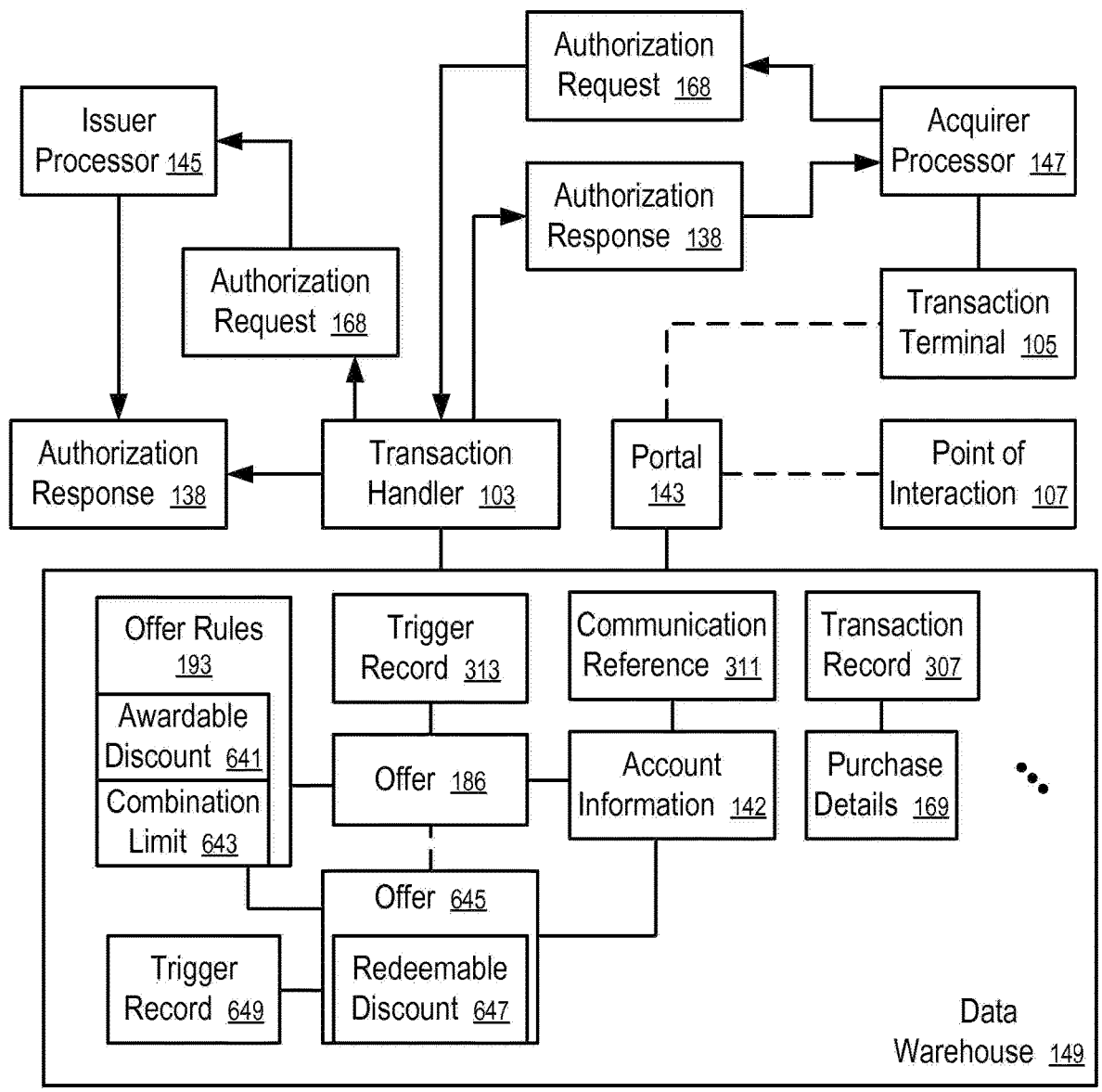
FIG. 2 shows a system to manage multiple discounts according to one embodiment.

FIG. 2 shows a system to manage multiple discounts according to one embodiment. In FIG. 2, an offer (186) is configured to allow a user (101) to earn discounts via first transactions made using the consumer account (146) identified by the account information (142), and to redeem the earned discounts via second transactions made using the consumer account (146).

In FIG. 2, the offer (186) includes offer rules (193), such as awardable discount (641), combination limit (643) for the discounts, etc.

In one embodiment, the awardable discount (641) identifies the amount of discount that the user (101) may earn in response to a qualifying event, such as the authorization request (168) or the authorization response (138) for a payment transaction that satisfies a set of conditions identified in the offer rules (193), enrollment in a program, checking in with a merchant on a social network site, etc. The amount of the discount may be predetermined (e.g., $5 off per qualifying event), or determined based on the transaction amount of the qualifying transaction (e.g., a discount of % 10 of the current transaction applicable to the next transaction).

In one embodiment, discounts may be provided in terms of the transaction amount of the subsequent transaction that satisfies the requirements for the redemption of the offer (186). For example, an offer (186) may be configured to provide a 10% discount off the next payment transaction with the merchant, when the current payment transaction meets the requirement for awarding the discount.

In one embodiment, discounts may be provided in terms of the purchase price of a specific item paid for by the subsequent transaction that satisfies the requirements for the redemption of the offer (186). For example, an offer (186) may be configured to provide a 10% discount off or $1 off the price of a specific item purchased via the next payment transaction with the merchant, when the current payment transaction meets the requirement for awarding the discount.

For example, in one embodiment, in response to a determination that the transaction corresponding to the authorization response (138) satisfies the conditions for awarding a discount in accordance with the offer rules (193) of the offer (186), the data warehouse (149) stores the data identifying the redeemable discount (647) of the offer (186).

In FIG. 2, the combination limit (643) indicates the upper limit of discounts that can be combined for redemption in a single payment transaction.

For example, the offer (186) may limit the combination of discounts up to a predetermined threshold (e.g., no more than $20 discounts can be redeemed in a single payment transaction).

For example, the offer (186) may limit the combination of discounts up to a predetermined percentage of the transaction amount of the payment transaction that satisfies the discount redemption requirements (e.g., no more than 20% discounts can be redeemed in a single payment transaction).

For example, the offer (186) may limit the combination of discounts up to a predetermined discounts (e.g., no more than 3 discounts can be redeemed in a single payment transaction, where each discount provides a 10% or $1 off the purchase price of a specific product paid for via the payment transaction).

For example, the offer (186) may limit the combination of discounts up to a predetermined number of discounts (e.g., no more than 3 discounts that can be combined for redemption in a single payment transaction).

In FIG. 2, when the user (101) earns more than one discount in accordance with the offer rules (193) of the offer (186), the data warehouse (149) is configured to combine the discounts in the redeemable discount (647) in accordance with the offer rules (193). The redeemable discount (647) identifies the discounts accumulated according to the combination limit (643) for redemption in a single transaction.

For example, in one embodiment, when the authorization request (168) or the authorization response (138) for transaction is determined to satisfy the redemption requirements of the offer rules (193) of the offer (186), the transaction handler (103) is configured to apply the redeemable discount (647) to the transaction by adjusting the transaction amount in a way as illustrated in FIGS. 6-9 and discussed in section entitled "APPLY OFFER".

In one embodiment, when the benefit of the discount is sponsored by a third party (e.g., an advertisement network, a product manufacturer, a government entity, a charity organization), the benefit of the discount can be applied to the transaction by seamlessly combining a transaction with the issuer processor (145) for a discounted payment transaction and a transaction with the sponsor for the cost of the discount to meet the requirements of the requested transaction from the transaction terminal (105), as further described in U.S. Pat. Pub. No. 2013/0246150, entitled "Systems and Methods to Apply the Benefit of Offers via a Transaction Handler", the disclosure of which is hereby incorporated herein by reference.

In one embodiment, when the discounts earned by the user (101) exceed the combination limit (643), the data warehouse (149) is configured to store a further data record to track the additional discounts that can be redeemed after the redeemable discount (647) is redeemed and applied to a qualifying transaction.

In some embodiments, the redeemable discount (647) records the discounts earned by the user (101) in accordance with the offer rules (193); and the transaction handler (103)

is configured to dynamically combine discounts according to the combination limit (643) at the time of redemption (e.g., in response to a transaction that meets the redemption requirements).

In one embodiment, the offer rules (193) also indicate whether partial redemption of a discount is allowable. For example, when the transaction amount of a transaction is smaller than the amount of discount provided by the redeemable discount (647), the offer rules (193) may allow the unused portion of the redeemable discount (647) to remain in the data record for redemption in a subsequent transaction.

For example, when the redeemable discount (647) provides the benefit of $10 off a qualifying transaction and a redeeming transaction has a transaction amount of $6.5, the unused portion of the redeemable discount (647) is $3.5 (=$10−$6.5). When the offer rules (193) allow partial redemption, the transaction handler (103) is configured to apply the $6.5 discount to the transaction; and the redeemable discount (647) is updated to indicate a discount of $3.5 available for redemption in a future transaction. When the offer rules (193) prohibit partial redemption, the transaction handler (103) is configured to apply the $6.5 discount to the transaction; and the redeemable discount (647) is cleared or removed.

In one embodiment, the offer rules (193) may also specify the requirements to be met by the redeeming transaction in order to apply the redeemable discount (647). For example, the offer rules (193) may require that the transaction amount of the redeeming transaction be above a threshold to qualify for the benefit of the redeemable discount (647). For example, the offer rules (193) may require that the transaction amount of the redeeming transaction be above the amount of the awardable discount (641) to qualify for the benefit of the redeemable discount (647).

In one embodiment, a single trigger record (313) is configured for the detection of both the transactions that qualify for earning the awardable discounts (641) and the transactions that qualify for the redemption of the redeemable discount (647). Alternatively, separate trigger record (313) can be configured for the detection of the transactions that qualify for earning the awardable discounts (641) and for the detection of the transactions that qualify for the redemption of the redeemable discount (647).

Figure 3:
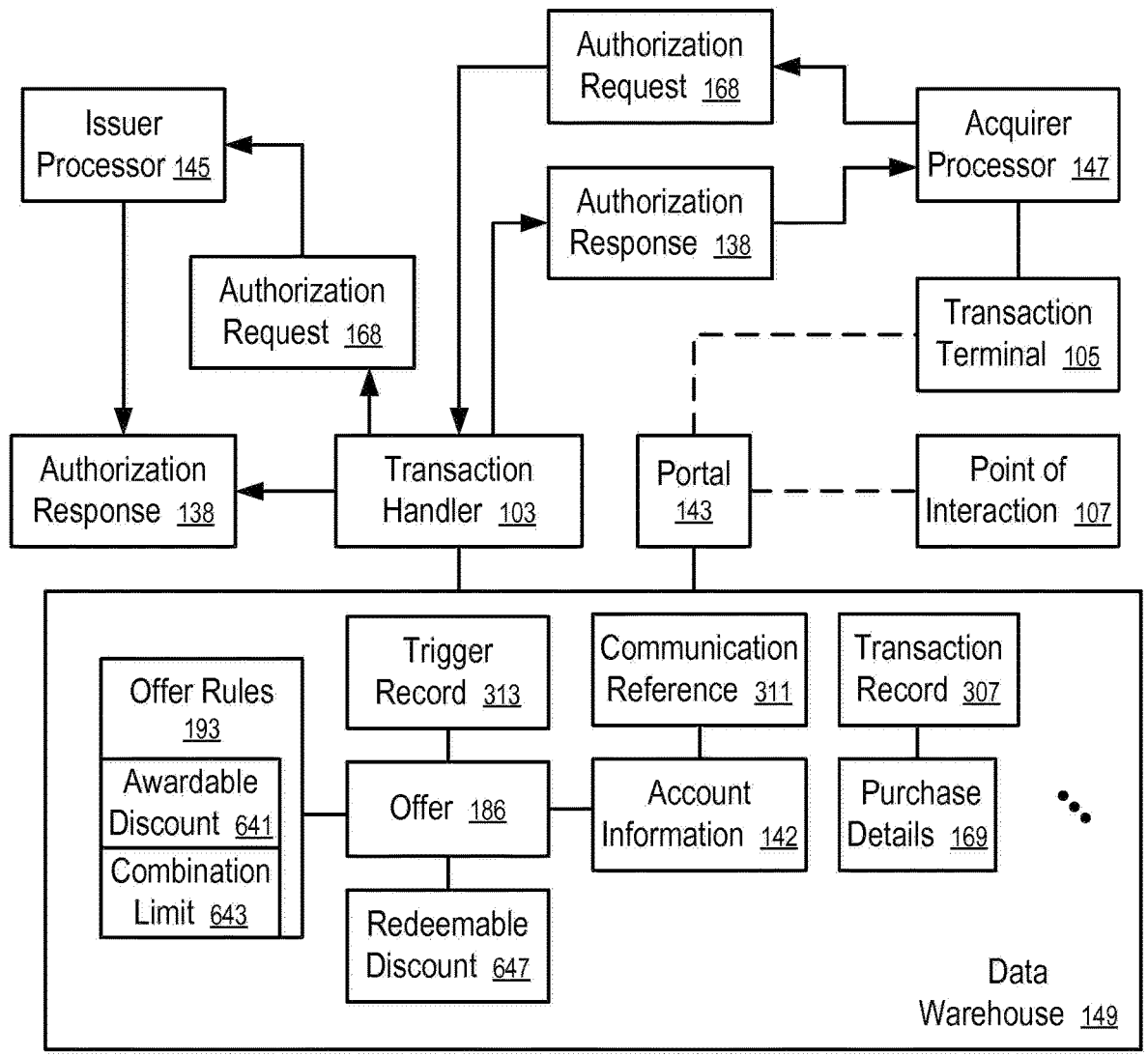
FIG. 3 shows another system to manage multiple discounts according to one embodiment.

FIG. 3 shows another system to manage multiple discounts according to one embodiment. In FIG. 3, separate trigger records (313 and 649) are used to detect transactions that may be qualified for receiving the awardable discount (641) and to detect transaction that may be qualified for the redemption of redeemable discount (647).

In FIG. 3, the trigger record (313) is configured to trigger the processing of offer (186) to reward the awardable discount (641). For example, if the authorization response (138) or the authorization request (168) of a transaction meets the requirement of the trigger record (313), the trigger record (313) causes the processing of the offer (186) to determine if the transaction qualifies for the awardable discount (641). If the transaction qualifies for the awardable discount (641), the offer (645) is activated to associated the redeemable discount (647) with the account information (142) identified in the transaction.

In one embodiment, activating the offer (645) for association with the account information (142) is in accordance with the offer rules (193), such as the awardable discount (641), the combination limit (643), etc. For example, if the account information (142) does not have a previously earned offer (645) containing redeemable discount (647) awarded in accordance with the offer rules (193), the offer (645) is linked to the account information (142) with the redeemable discount (647) being set according to the awardable discount (641) for the transaction. For example, if the discounts combined in the offer (645) have not reached the combination limit (643), the awardable discount (641) earned from the transaction is added to the redeemable discount (647) of the offer (645). For example, if the discounts combined in the offer (645) have reached the combination limit (643), a separate offer is activated and linked to the account information (142) to provide the awardable discount (641) as the redeemable discount (647) of the separate offer. The separate offer is queued after the offer (645) for redemption (e.g., no trigger record is generated for the separate offer until the benefit of the offer (645) is redeemed).

In FIG. 3, the trigger record (649) is configured to trigger the processing of offer (645) to redeem the benefit of the redeemable discount (647). For example, if the authorization response (138) or the authorization request (168) of a transaction meets the requirement of the trigger record (649), the trigger record (649) causes the processing of the offer (645) to determine if the transaction qualifies for the benefit of the redeemable discount (647). If the transaction qualifies for the benefit of the redeemable discount (647), the transaction handler (103) is configured to provide the applicable discount via modification of the transaction amount, as illustrated in FIGS. 6-9 when the discount is sponsored by the merchant, or via combining a modified transaction with a separate transaction with the sponsor to meet the required transaction with the acquirer processor (147), in a way as illustrated in U.S. Pat. Pub. No. 2013/0246150, when the discount is not sponsored by the merchant.

When the offer rules (193) prohibit partial redemption of the redeemable discount (647), the offer (645) is unlinked from the account information (142) after the benefit of the offer (645) is applied to a redeeming transaction. If there is a separate offer with an amount of redeemable discount queued after the offer (645) for redemption, the trigger record (649) is updated to trigger the processing of the separate offer. Alternatively, the trigger record (649) for the offer (645) can be deleted; and a new trigger record can be generated for the separate offer (645).

When the offer rules (193) allows partial redemption of the redeemable discount (647) and the redeeming transaction uses only a portion of the redeemable discount (647), the redeemable discount (647) of the offer (645) is updated to identify the remaining portion of the unused discount. Thus, when a subsequent redeeming transaction is detected via the trigger record (649), the remaining portion of the unused discount can be applied to the subsequent redeeming transaction in a similar way. Further, if there is a separate offer having an amount of redeemable discount queued after the offer (645) for redemption, it is determined whether the redeemable discount of the separate offer can be combined with the offer (645) in accordance with the combination limit (643); and if so, the redeemable discount (647) is updated to include the discount provided in the separate offer which, after the combination, can be eliminated or unlinked from the account information (142).

Figure 4:
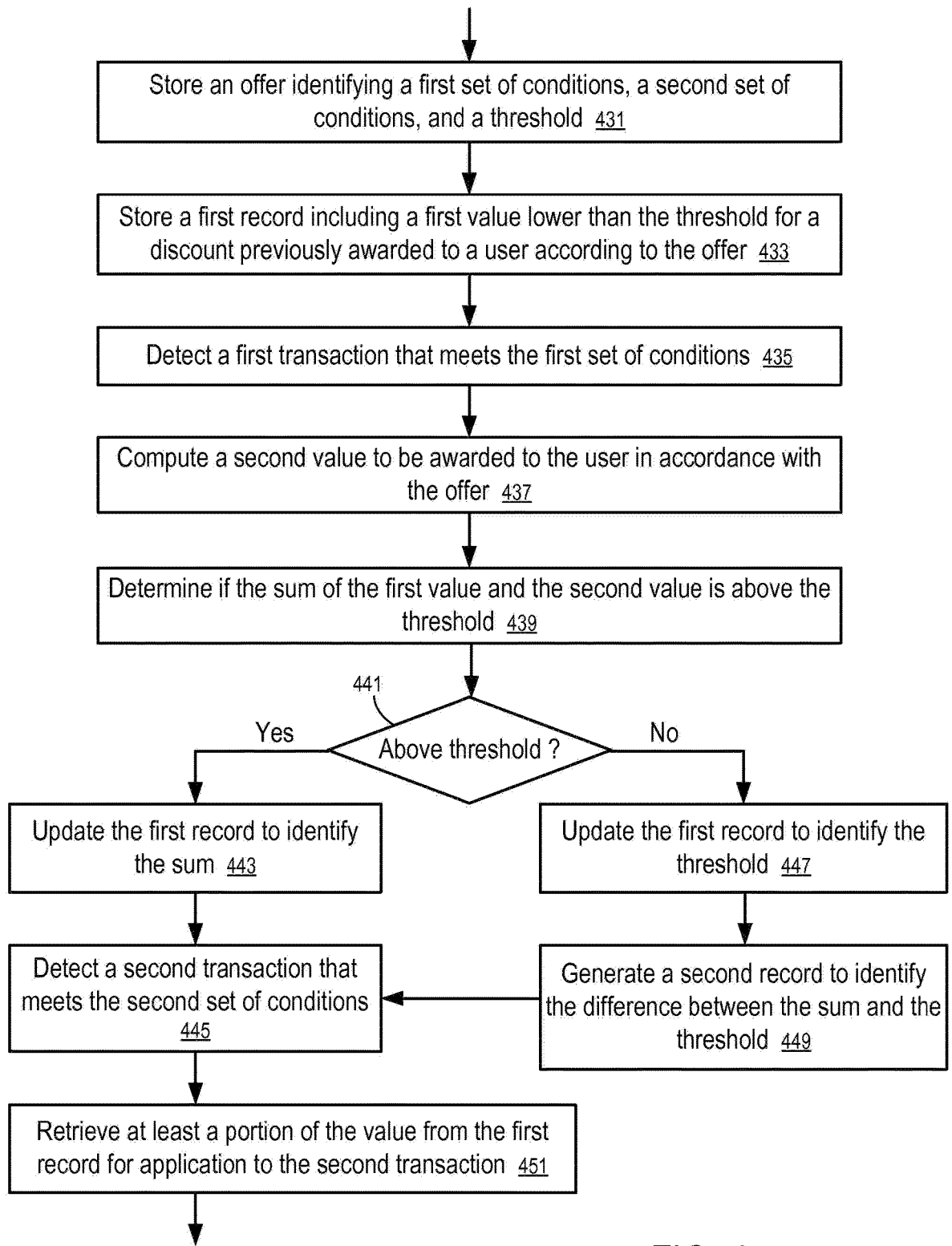
FIG. 4 shows a method to manage multiple discounts via a technique to organize and consolidate data according to one embodiment.

FIG. 4 shows a method to manage multiple discounts via a technique to organize and consolidate data according to one embodiment. For examples, the method of FIG. 4 can be implemented using the technique of FIG. 1 in the system of FIG. 2 or 3.

In one embodiment, a computing apparatus is configured to: store (431) an offer (186) identifying a first set of conditions, a second set of conditions, and a threshold (403 or 643); store (433) a first record (405) including a first value (407) lower than the threshold (403 or 643) for a discount previously awarded to a user according to the offer (186); detect (435) a first transaction that meets the first set of conditions; compute (437) a second value (401) to be awarded to the user in accordance with the offer (186); and determine (439) if the sum of the first value (405) and the second value (401) is above the threshold (403 or 643).

If the sum is determined (439) to be above threshold (403 or 643), the computing apparatus updates (443) the first record (405) to identify the sum; otherwise, the computing apparatus updates (447) the first record (405) to identify the threshold (403) and generates (449) a second record (415) to identify the difference between the sum and the threshold (403 or 643).

The computing apparatus is further configured to detect (445) a second transaction that meets the second set of conditions and retrieve (451) at least a portion of the value (e.g., 419) from the first record (405) for application to the second transaction. Examples of applying the value to a transaction are provided further below.

In one embodiment, the offer (186) is configured to provide discounts; and the computing apparatus is configured to aggregate discounts earned by the user in accordance with the offer (186). The offer (186) specifies a threshold for maximum number of discounts that can be redeemed in one transaction, which is used to determine the accumulation threshold (403). For example, an offer may allow only one discount to be redeemed at a time, or more than one discount to be redeemed in one transaction. The offer allows partial discount redemption such that in a qualified transaction the user may use only a person of the discounts and save the unused portion of the discounts for a subsequent transaction. After partial discount redemption, data is stored to indicate the remainder amount of the partially redeemed discount so that the user may redeem the unclaimed portion of the discount in a subsequent payment transaction.

Based on the transaction data, the computing apparatus may further present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. Some examples of targeted offer delivery are provided in U.S. Pat. No. 8,606,630, entitled "Systems and Methods to Deliver Targeted Advertisements to Audience", the entire disclosure of which is hereby incorporated herein by reference.

For example, the computing apparatus can be configured to generate trigger records for a transaction handler to identify authorization requests that satisfy the conditions specified in the trigger records, identify communication references of the users associated with the identified authorization requests, and use the communication references to target real-time messages at the users in parallel with the transaction handler providing responses to the respective authorization requests. Details in one embodiment regarding the generation and delivery of messages in real-time with the processing of transactions are provided in the section entitled "REAL-TIME MESSAGES", and U.S. Pat. Nos. 8,359,274 and 8,407,148, both entitled "Systems and Methods to Provide Messages in Real-Time with Transaction Processing", the entire disclosures of which are hereby incorporated herein by reference.

For example, the computing apparatus can be programmable for real-time interaction with users to provide messages and/or offers, validate fulfillment conditions, and provide benefits to qualified users to fulfill the offers. In one embodiment, the computing apparatus is configured to be programmed via accepting definitions of independent events and linking the events via prerequisite requirements to specify qualification conditions. The linked events form a flow or network of events; and user progress in the flow or network of events is tracked. The operations for each event are performed in an atomic way to allow the user positions in the flow or network of events to be identified as being in between adjacent events in the network. As a result, the programming of the real-time interaction, including the offer rules and messages, can be easily modified during the execution of the programming. Details in one embodiment regarding the formulation and management of real-time interaction are provided in U.S. Pat. App. Pub. No. 2012/0078697, entitled "Systems and Methods to Program Operations for Interaction with Users", the entire disclosure of which application is hereby incorporated herein by reference.

For example, the computing apparatus can be configured to include a set of autonomous components coupled together via a messaging system and a workflow for an offer or loyalty program. The processing of different offers or loyalty programs can be programmed via customizing the workflows of the autonomous components and their configuration parameters. When a transaction that may be relevant to an offer or loyalty program is detected, the data about the transaction and other relevant data, including the workflow of the offer or loyalty program and the processing results of relevant components, can be posted on the messaging system for further processing according to the workflow. Thus, the computing apparatus can support the rapid development and deployment of offers or loyalty programs having different structures and rules. Details in one embodiment regarding such a computing platform for the processing of offers and loyalty programs are provided in the section entitled "DYNAMIC PROCESSING FLOW".

In one embodiment, the transaction handler is configured to apply the benefit of a registered offer during the authorization of a qualified transaction that meets the requirements for the redemption of the offer. For example, the benefit of the registered offer can be provided in the form of a reduced transaction amount authorized for the qualified transaction, reduced via the transaction handler changing the transaction amount in authorization messages during the authorization phase of the transaction in one embodiment. The transaction handler is configured in one embodiment to further embed information about the offer based on which the transaction amount is modified in the authorization response transmitted, via the acquirer processor of the merchant, to the transaction terminal of the merchant. The embedded information allows the transaction terminal to prompt an operation to accept the reduced transaction amount and/or to request further details to decide whether or not to accept the transaction amount, to provide information to the merchant system for bookkeeping and/or track the effectiveness of the offer campaign, and/or to identify the offer in the receipt for the transaction. Further details and examples are provided in the section entitled "APPLY OFFER" and U.S. Pat. App. Pub. Nos. 2013/0091000 and 2013/0124287, both entitled "Systems and Methods to Provide Discount at Point of Sales Terminals", the entire disclosures of which applications are hereby incorporated herein by reference.

For example, the computing apparatus correlates transactions with activities that occurred outside the context of the transaction, such as online advertisements presented to the customers that at least in part cause offline transactions. The correlation data can be used to demonstrate the success of the advertisements, and/or to improve intelligence information about how individual customers and/or various types or groups of customers respond to the advertisements. Examples of correlating offline transactions with online activities can be found in U.S. Pat. No. 8,626,579, entitled "Systems and Methods for Closing the Loop between Online Activities and Offline Purchases", the entire disclosure of which is hereby incorporated herein by reference.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

Transaction Data Based Services

Figure 10:
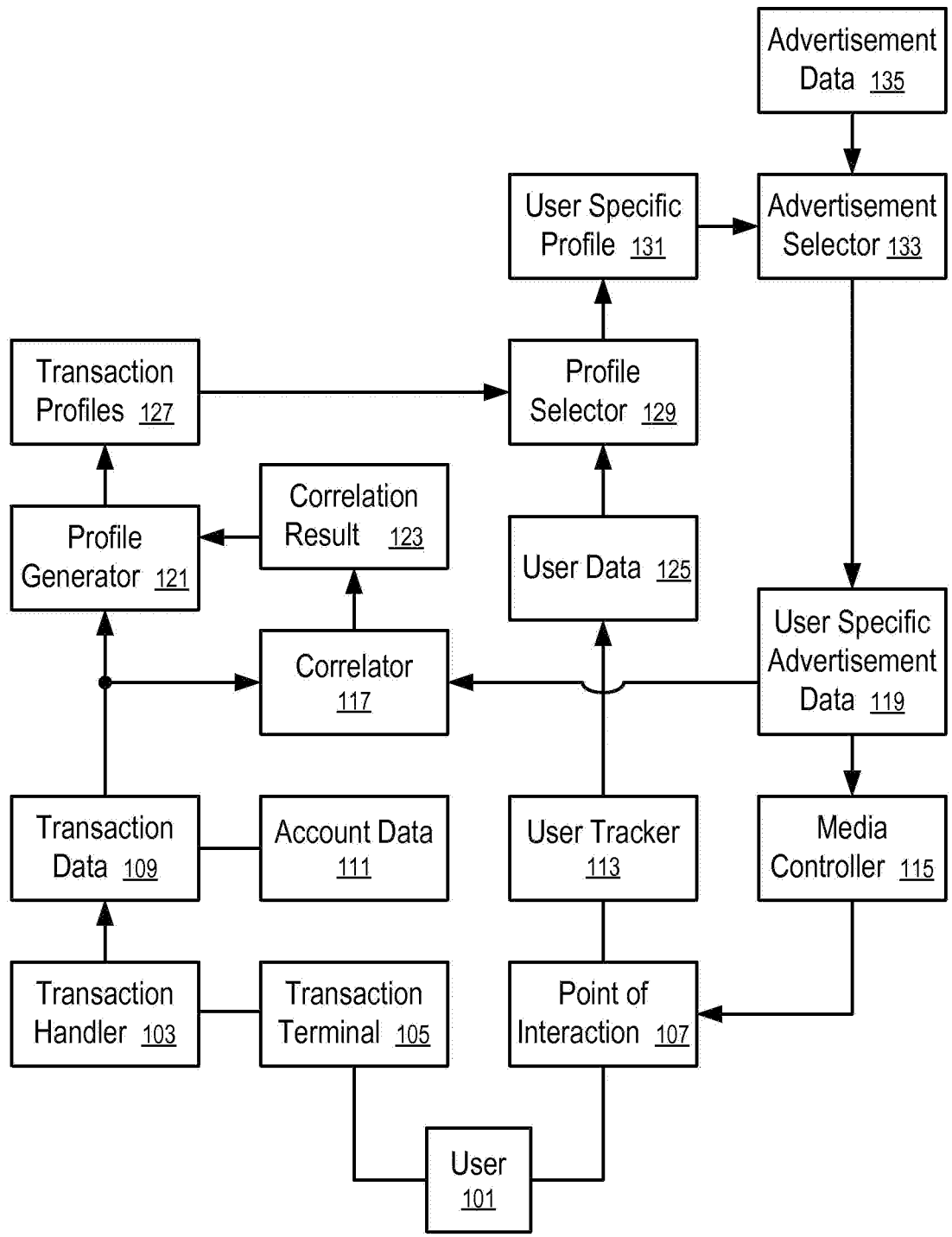
FIG. 10 illustrates a system to provide services based on transaction data according to one embodiment.

FIG. 10 illustrates a system to provide services based on transaction data according to one embodiment. In FIG. 10, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In FIG. 10, the system further includes a correlator (117) to correlate user specific advertisement data (119) with transactions resulting from the user specific advertisement data (119). The correlation results (123) can be used by the profile generator (121) to improve the transaction profiles (127).

The transaction profiles (127) of one embodiment are generated from the transaction data (109). For example, an aggregated spending profile can be generated via a factor analysis and cluster analysis to summarize the spending patterns/behaviors reflected in the transaction records, in a way as illustrated in U.S. Pat. App. Pub. No. 2010/0306032, the disclosure of which is hereby incorporated herein by reference.

Figure 13:
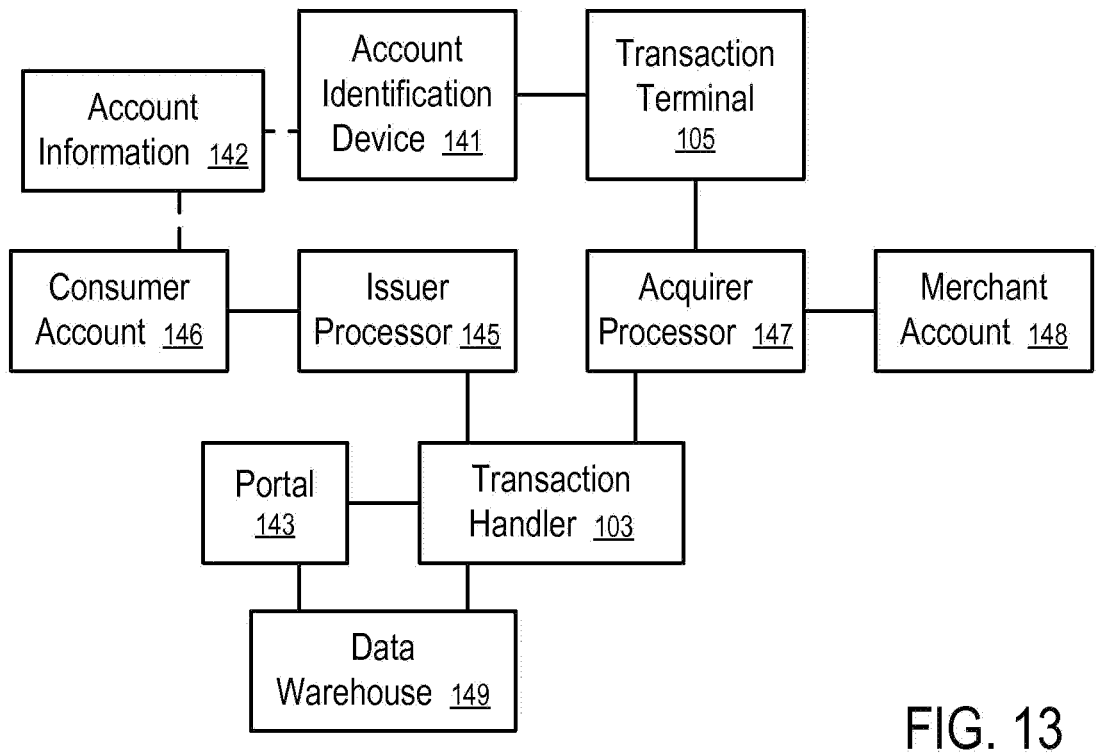
FIG. 13 shows a system to provide information based on transaction data according to one embodiment.

In one embodiment, a data warehouse (149) as illustrated in FIG. 13 is coupled with the transaction handler (103) to store the transaction data (109) and other data, such as account data (111), transaction profiles (127) and correlation results (123). In FIG. 13, a portal (143) is coupled with the data warehouse (149) to provide data or information derived from the transaction data (109), in response to a query request from a third party or as an alert or notification message.

In FIG. 13, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 14:
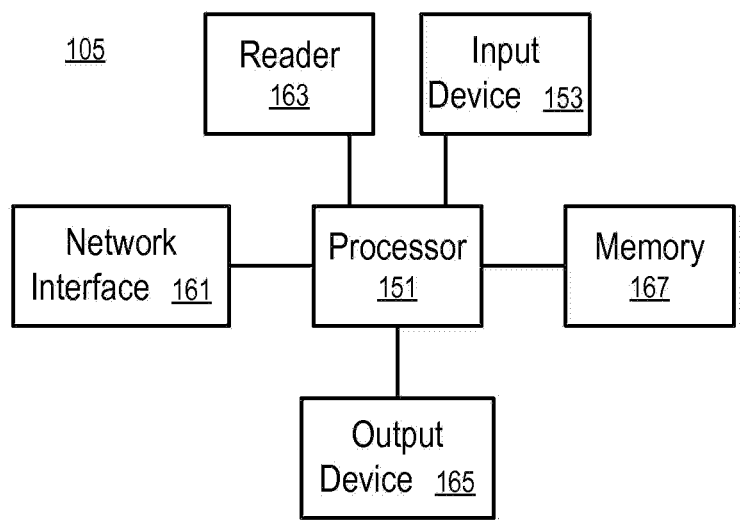
FIG. 14 illustrates a transaction terminal according to one embodiment.
Figure 15:
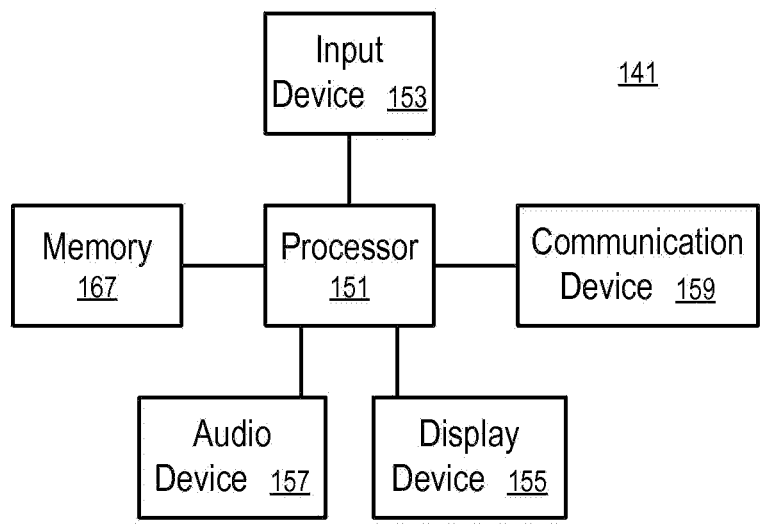
FIG. 15 illustrates an account identifying device according to one embodiment.
Figure 16:
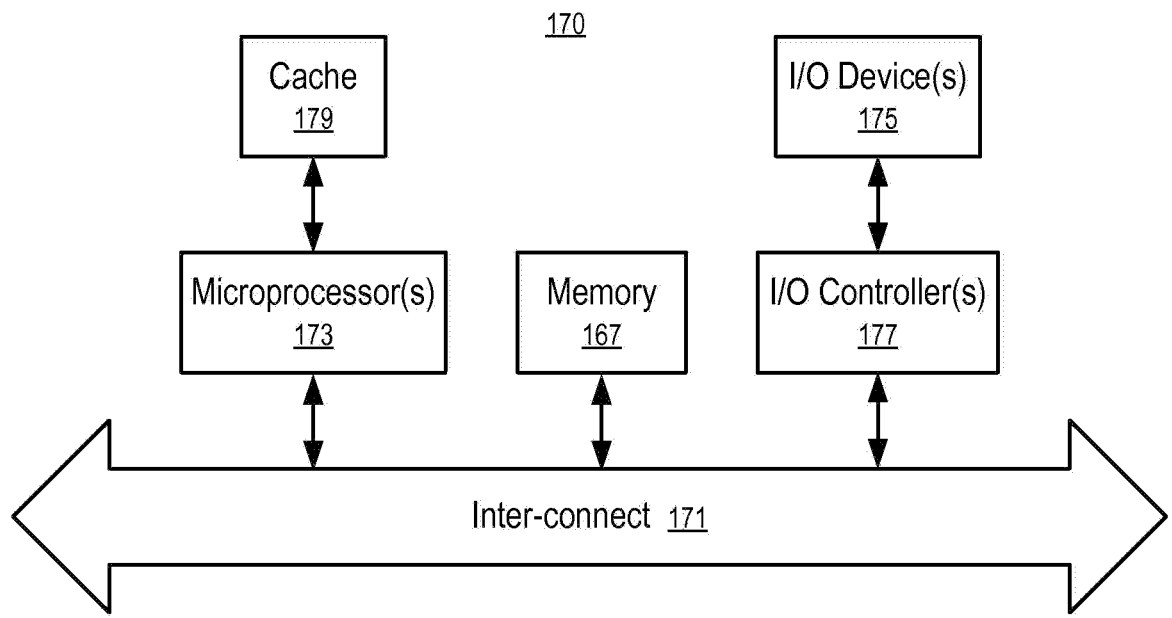
FIG. 16 illustrates a data processing system according to one embodiment.

FIGS. 14 and 15 illustrate examples of transaction terminals (105) and account identification devices (141). FIG. 16 illustrates the structure of a data processing system (170) that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated, such as, in FIGS. 10 and 13-16, and other figures, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) couples with a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section. For example, the centralized data warehouse (149) may include the advertisement data (135) and/or offers of benefits such as discount, reward, points, cashback, etc. The offers can be communicated to the users (e.g., 101) via the advertisement data (135) or as part of the advertisement data (135).

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 10, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. App. Pub. No. 2011/0054981, and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) (and/or the portal (143)) is configured to provide at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The transaction profiles (127) of one embodiment include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

In one embodiment, the characteristics of transaction patterns of customers are profiled via clusters, factors, and/or categories of purchases. Further details and examples in one embodiment are provided in U.S. Pat. App. Pub. No. 2010/0306032, entitled "Systems and Methods to Summarize Transaction Data", and U.S. Pat. App. Pub. No. 2010/0306029, entitled "Cardholder Clusters".

In one embodiment, a set of profiles are generated from the transaction data for a plurality of geographical regions, such as mutually exclusive, non-overlapping regions defined by postal codes. Transactions of account holders residing in the regions are aggregated according to merchant categories for the respective regions and subsequently normalized to obtain preference indicators that reveal the spending preferences of the account holders in the respective regions. Each of the profiles for respective regions is based on a plurality of different account holders and/or households to avoid revealing private information about individual account holders or families. Further, the profiles are constructed in a way to make it impossible to reverse calculate the transaction amounts. Further details and examples about profiles constructed for regions in one embodiment are provided in U.S. Pat. App. Pub. No. 2013/0124263, entitled "Systems and Methods to Summarize Transaction data," the disclosure of which is hereby incorporated herein by reference.

Loyalty Program

In one embodiment, the transaction handler (103) uses the account data (111) to store information for third party loyalty programs.

Figure 11:
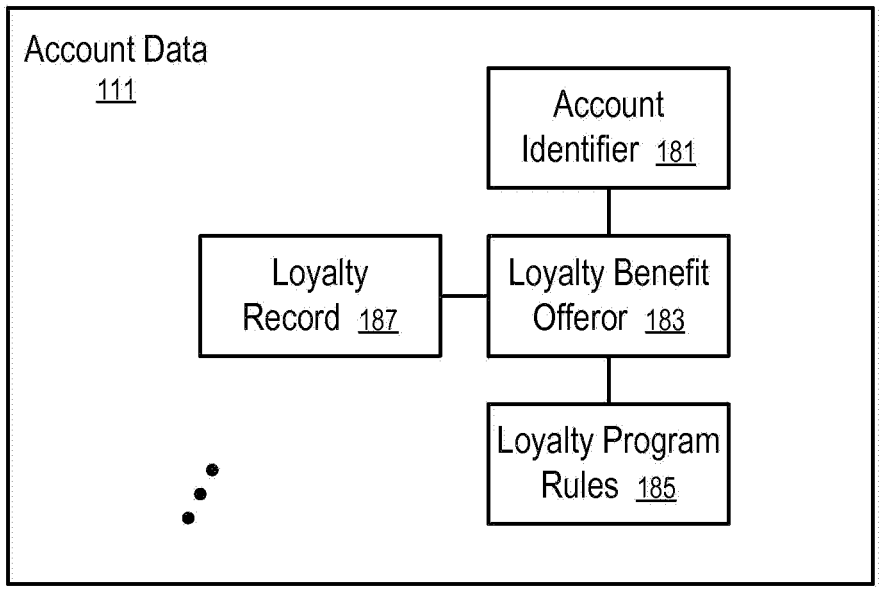
FIG. 11 shows the structure of account data for providing loyalty programs according to one embodiment.

FIG. 11 shows the structure of account data (111) for providing loyalty programs according to one embodiment. In FIG. 11, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 11 illustrates the data related to one third party loyalty program of a loyalty benefit offeror (183). In one embodiment, the account identifier (181) may be linked to multiple loyalty benefit offerors (e.g., 183), corresponding to different third party loyalty programs. The third party loyalty program of the loyalty benefit offeror (183) provides the user (101), identified by the account identifier (181), with benefits, such as discounts, rewards, incentives, cash back, gifts, coupons, and/or privileges.

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

A method to provide loyalty programs of one embodiment includes the use of the transaction handler (103) as part of a computing apparatus. The computing apparatus processes a plurality of payment card transactions. After the computing apparatus receives a request to track transactions for a loyalty program, such as the loyalty program rules (185), the computing apparatus stores and updates loyalty program information in response to transactions occurring in the loyalty program. The computing apparatus provides to a customer (e.g., 101) an offer of a benefit when the customer satisfies a condition defined in the loyalty program, such as the loyalty program rules (185). In one embodiment, the loyalty benefit as identified in the loyalty record (187) can be redeemed in connection with a transaction in a way the benefit of an offer stored in association with the account identifier (181) is redeemed.

Examples of loyalty programs through collaboration between collaborative constituents in a payment processing system, including the transaction handler (103) in one embodiment are provided in U.S. Pat. App. Pub. No. 2008/0059302, and entitled "Loyalty Program Service," U.S. Pat. App. Pub. No. 2008/0059306, and entitled "Loyalty Program Incentive Determination," and U.S. Pat. App. Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. Pat. App. Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. Pat. App. Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. Pat. App. Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. Pat. App. Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. Pat. App. Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. Pat. App. Pub. No. 2010/0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. Pat. App. Pub. No. 2010/0114686, and entitled "Real-Time Statement Credits and Notifications," the disclosure of which is hereby incorporated herein by reference.

Details on loyalty programs in one embodiment are provided in U.S. Pat. App. Pub. No. 2011/0087530, and entitled "Systems and Methods to Provide Loyalty Programs," the disclosure of which is hereby incorporated herein by reference.

Real-Time Messages

In one embodiment, the transaction handler (103) is configured to cooperate with the media controller (115) to facilitate real-time interaction with the user (101) when the payment of the user (101) is being processed by the transaction handler (103). The real-time interaction provides the opportunity to impact the user experience during the purchase (e.g., at the time of card swipe), through delivering messages in real-time to a point of interaction (107), such as a mobile phone, a personal digital assistant, a portable computer, etc. The real-time message can be delivered via short message service (SMS), email, instant messaging, or other communications protocols.

In one embodiment, the real-time message is provided without requiring modifications to existing systems used by the merchants and/or issuers.

Figure 12:
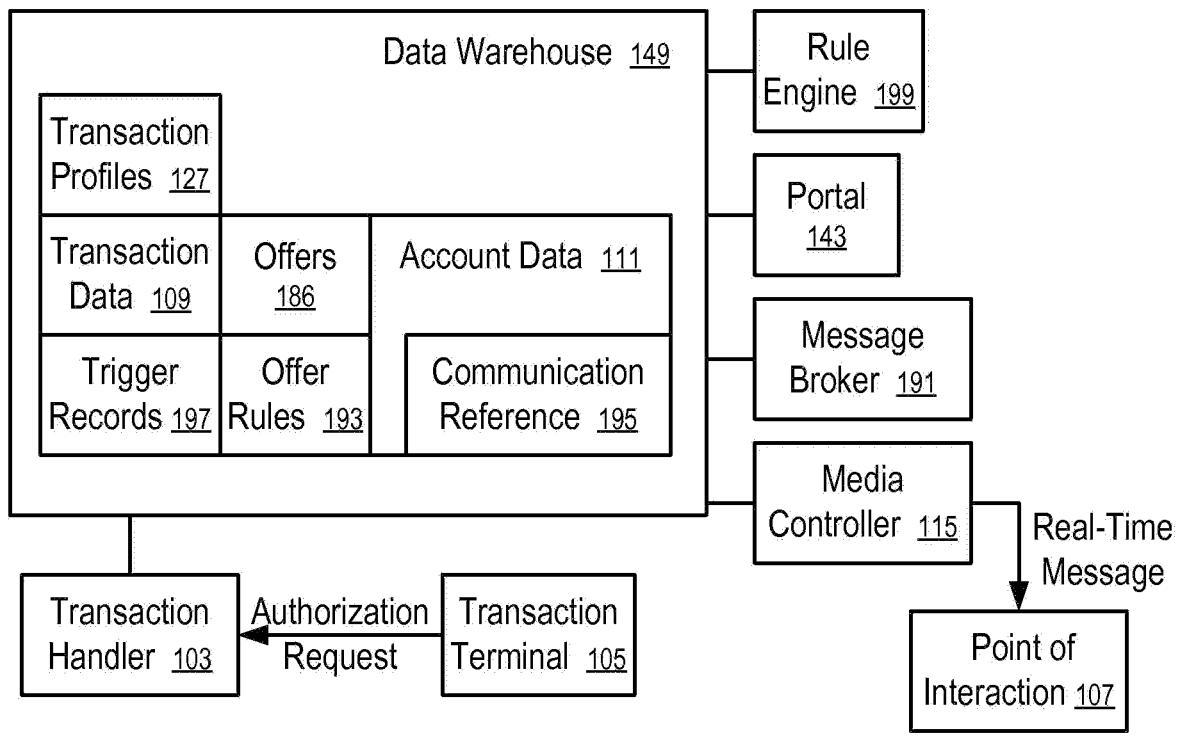
FIG. 12 shows a system to provide real-time messages according to one embodiment.

FIG. 12 shows a system to provide real-time messages according to one embodiment. In FIG. 12, the transaction handler (103) (or a separate computing system coupled with the transaction handler (103)) is to detect the occurrence of certain transactions of interest during the processing of the authorization requests received from the transaction terminal (105); a message broker (191) is to identify a relevant message for the user (101) associated with the corresponding authorization request; and the media controller (115) is to provide the message to the user (101) at the point of interaction (107) via a communication channel separate from the channel used by the transaction handler (103) to respond to the corresponding authorization request submitted from the transaction terminal (105).

In one embodiment, the media controller (115) is to provide the message to the point of interaction (107) in parallel with the transaction handler (103) providing the response to the authorization request.

In one embodiment, the point of interaction (107) receives the message from the media controller (115) in real-time with the transaction handler (103) processing the authorization request. In one embodiment, the message is to arrive at the point of interaction (107) in the context of the response provided from the transaction handler (103) to the transaction terminal (105). For example, the message is to arrive at the point of interaction (107) substantially at the same time as the response to the authorization request arrives at the transaction terminal, or with a delay not long enough to cause the user (101) to have the impression that the message is in response to an action other that the payment transaction. For example, the message is to arrive at the point of interaction (107) prior to the user (101) completing the transaction and leaving the transaction terminal (105), or prior to the user (101) leaving the retail location of the merchant operating the transaction terminal (105).

In FIG. 12, the system includes a portal (143) to provide services to merchants and/or the user (101).

For example, in one embodiment, the portal (143) allows the user (101) to register the communication reference (195) in association with the account data (111), such as the account information (142) of the consumer account (146); and the media controller (115) is to use the communication reference (195) to deliver the message to the point of interaction (107). Examples of the communication reference (195) includes a mobile phone number, an email address, a user identifier of an instant messaging system, an IP address, etc.

In one embodiment, the portal (143) allows merchants and/or other parties to define rules (193) to provide offers (186) as real-time responses to authorization requests; and based on the offer rules (193), the message broker (191) is to generate, or instruct the media controller to generate, the real-time message to provide the offers (186) to the user (101). For example, the offer (186) may include a discount, an incentive, a reward, a rebate, a gift, or other benefit, which can be redeemed upon the satisfaction of certain conditions required by the offer rules (193). In one embodiment, based on the offer rules (193) the message broker (191) configures a message by selecting the appropriate message template from (an) existing message(s) template(s), and inserts any relevant data (e.g., the communication reference (195)) into the selected template, then passes the configured message to the media controller (115), which delivers the message to the point of interaction (107). In one embodiment, the message broker (191) (or a subsystem) is used to manage message templates along with the rules for selecting the appropriate message template from among several potential choices.

In one embodiment, the offer rules (193) include offer details, targeting rules, advertisement campaign details, profile mapping, creative mapping, qualification rules, award/notify/fulfillment rules, approvals, etc. Creative elements for offers include text, images, channels, approvals, etc.

In one embodiment, when the offer rules (193) are activated by the merchant or advertiser via the portal (143), the message broker (191) is to generate trigger records (197) for the transaction handler (103). The transaction handler (103) is to monitor the incoming authorization requests to identify requests that satisfy the conditions specified in the trigger records (197) during the process of the authorization requests, and to provide the information about the identified requests to the message broker (191) for the transmission of an appropriate real-time message in accordance with the offer rules (193).

In one embodiment, the generation of the trigger records (197) for the transaction handler (103) is in real-time with the merchant or advertiser activating the offer rules (193). Thus, the offer rules (193) can be activated and used for the detection of the new authorization requests in real-time, while the transaction handler (103) continues to process the incoming authorization requests.

In one embodiment, the portal (143) provides information about the spending behaviors reflected in the transaction data (109) to assist the merchants or advertisers to target offers or advertisements. For example, in one embodiment, the portal (143) allows merchants to target the offers (186) based on transaction profiles (127). For example, the offer rules (193) are partially based on the values in a transaction profile (127), such as an aggregated spending profile. In one embodiment, the offer rules (193) are partially based on the information about the last purchase of the user (101) from the merchant operating the transaction terminal (105) (or another merchant), and/or the information about the location of the user (101), such as the location determined based on the location of the transaction terminal (105) and/or the location of the merchant operating the transaction terminal (105).

In one embodiment, the portal (143) provides transaction based statistics, such as merchant benchmarking statistics, industry/market segmentation, etc., to assist merchants and advertisers to identify customers.

Thus, the real-time messages can be used to influence customer behaviors while the customers are in the purchase mode.

In one embodiment, the benefit of the offers (186) can be redeemed via the transaction handler (103). The redemption of the offer (186) mayor may not require the purchase details (e.g., SKU level purchase details). Details in one embodiment about redeeming offers (186) via the transaction handler (103) are provided in U.S. Pat. App. Pub. No. 2011/0288918, and entitled "Systems and Methods for Redemption of Offers," the disclosure of which is hereby incorporated herein by reference.

In one embodiment, when the authorization request for a purchase indicates that the purchase qualifies the offer (186) for redemption if the purchase corresponding to the authorization request is completed, the message broker (191) is to construct a message and use the media controller (115) to deliver the message in real-time with the processing of the authorization request to the point of interaction (107). The message informs the user (101) that when the purchase is completed, the transaction handler (103) and/or the issuer processor (145) is to provide the benefit of the offer (186) to the user (101) via statement credit or some other settlement value, for example points in a registered loyalty program, or credit at the point of sale using a digital coupon delivered to the purchaser via cell phone.

In one embodiment, the settlement of the payment transaction corresponding to the authorization request does not occur in real-time with the processing of the authorization request. For example, the merchant may submit the complete purchases for settlement at the end of the day, or in accordance with a predetermined schedule. The settlement may occur one or more days after the processing of the authorization request.

In one embodiment, when transactions are settled, the settled transactions are matched to the authorization requests to identify offers (186) that are redeemable in view of the settlement. When the offer (186) is confirmed to be redeemable based on a record of successful settlement, the message broker (191) is to use the media controller (115) to provide a message to the point of interaction (107) of the user (101), such as the mobile phone of the user (101). In one embodiment, the message is to inform the user (101) of the benefit to be provided as statement credits and/or to provide additional offers. In one embodiment, the message to confirm the statement credits is transmitted in real-time with the completion of the transaction settlement.

In one embodiment, the message broker (191) is to determine the identity of the merchant based on the information included in the authorization request transmitted from the transaction terminal (105) to the transaction handler (103). In one embodiment, the identity of the merchant is normalized to allow the application of the offer rules (193) that are merchant specific.

In one embodiment, the portal (143) provides operation facilities, such as onboarding, contact management, certification, file management, workflow, etc. to assist the merchants and/or advertisers to complete the tasks related to the offers (186).

In one embodiment, the portal (143) allows the user (101) to opt in or opt out of the real-time message delivery service.

Dynamic Processing Flow

Different offers and loyalty programs may have different structures with different processing requirements in response to payment transactions.

For example, the processing of some offers and loyalty programs may involve the notification of transaction information to an offer provider for further processing.

For example, the processing of some offers and loyalty programs may involve the notification of transaction information to an offer provider for the determination of benefits and applying benefits to transactions in response to the response from the offer provider.

For example, the processing of some offers and loyalty programs may involve the provisioning of benefits of the programs, settling the cost of the benefits, and provide notifications to the users receiving the benefits.

For example, the processing of some offers and loyalty programs may involve delivering of offers and/or the management of the user enrollments, but others many not.

For example, the processing of some offers and loyalty programs may involve the inline application of benefits during the authorization of a payment transaction based on predetermined redemption requirements, but may or may not involve notifications to users.

In one embodiment, a messaging system (e.g., implemented using an enterprise service bus) is used to interconnect a set of independent, autonomous components for implementing loyalty programs via workflows. The messages posted on the enterprise service bus drive the operations of the components according to a workflow that implements the loyalty program. When implementing a loyalty program or offer having a new structure, a user interface allows a user to simply connect the functions of available components to define a new workflow and specify the configuration parameters of the components for the loyalty program of offer. Depositing the workflow in a repository activates the implementation of the loyalty program. The system allows the rapid development and deployment of new loyalty programs or offers in days, instead of months to a year.

Figure 5:
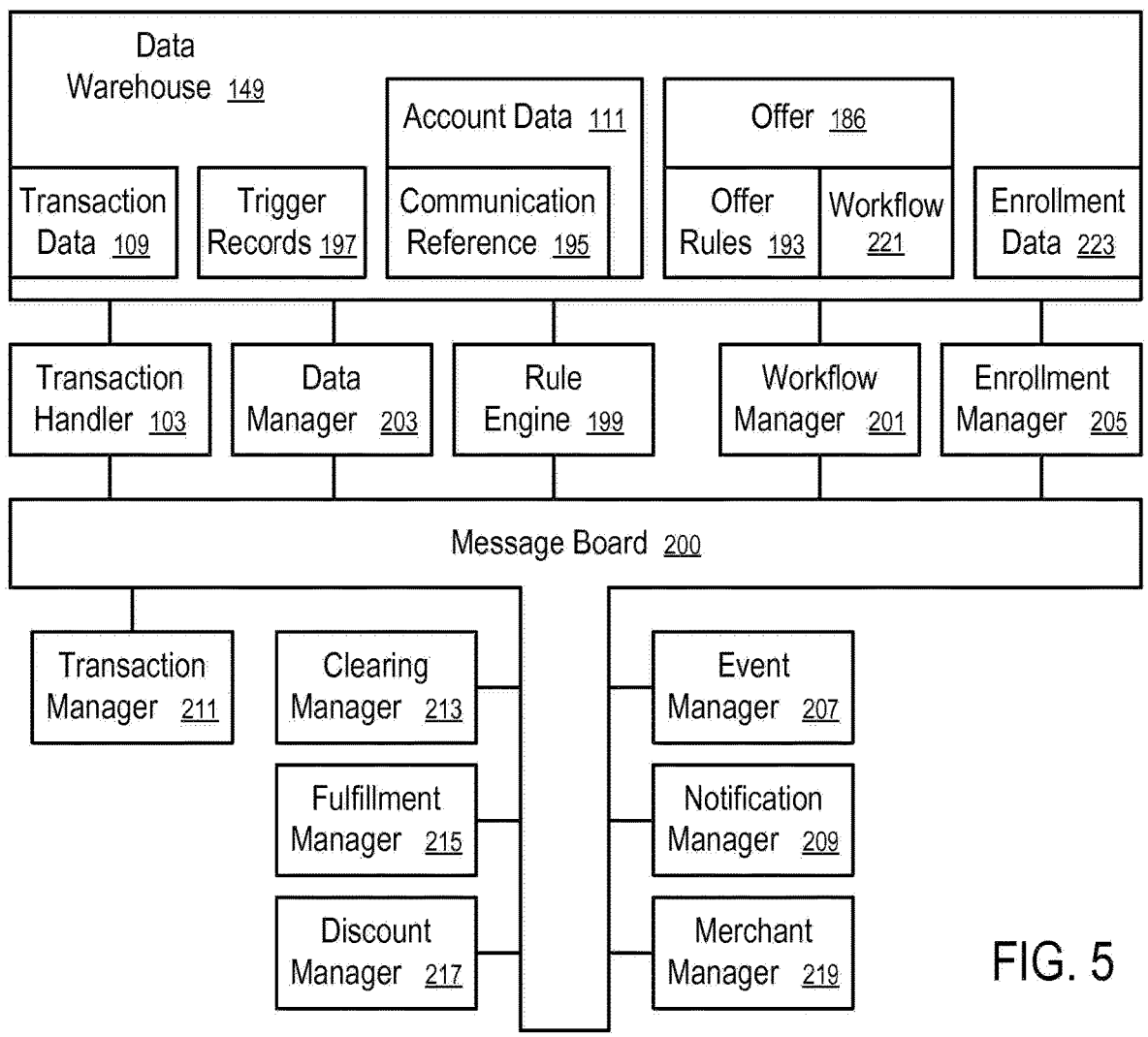
FIG. 5 shows a system configured to allow the dynamic configuration of the processing of offers and loyalty programs having different structures according to one embodiment.

FIG. 5 shows a system configured to allow the dynamic configuration of the processing of offers and loyalty programs having different structures according to one embodiment.

In FIG. 5, the data warehouse (149) is configured to store transaction data (109) of payment transactions processed by the transaction handler (103) and trigger records (197) for identifying transactions that may be of interest for transaction-related services, such as offer/loyalty benefit processing.

In FIG. 5, the data warehouse (149) further stores account data (111) of users (e.g., 101), including the account information (142) identifying the consumer account (146) of the user (101), and the communication reference (195) of the user (101) that may be used for the transmission of notification and/or alert.

In FIG. 5, the data warehouse (149) further stores the offer (186), including the offer rules (193) and the workflow (221) for the processing of the offer (186). In one embodiment, the offer (186) may include a discount offer, an incentive offer, a reward offer, a loyalty benefit redemption offer, and/or a loyalty program offer, etc.

In FIG. 5, the data warehouse (149) further stores enrollment data (223) identifying the enrollment status of users (e.g., 101), which associates the offer (186) with the account data (111) of the user (101) who has accepted the offer (186) and/or enrolled in the program associated with the offer (186).

In FIG. 5, the transaction handler (103) is configured to process the payment transactions in a payment network illustrated in FIG. 13 and use the trigger records (197) to identify transactions that satisfy the conditions specified in the trigger records (197) for further actions specified in the respective trigger records (197).

In FIG. 5, the rule engine (199) is configured to evaluate the rules, such as offer rules (193), to determine whether certain conditions are satisfied.

In FIG. 5, the workflow manager (201) is configured to provide a user interface that allows a user to design, modify, generate, and configure the workflow (221). In one embodiment, at least part of the offer rules (193) are configurable via the workflow manager (201).

In one embodiment, the workflow (221) specifies the processing follow by a set of autonomous components configured in the system, such as an enrollment manager (205), a transaction manager (211), a clearing manager (213), a fulfillment manager (215), a discount manager (217), an event manager (207), a notification manager (209), a merchant manager (219), etc.

In one embodiment, each of the autonomous components is configured to process available data independent of other autonomous components and/or the operation sequences of the components.

In FIG. 5, the enrollment manager (205) is configured to manage user-related data, including data registered by other workflow components such as the transaction manager (211) and the notification manager (209)). It may provide a user interface for a customer or a partner to input and manage user-related data, ensure consistent cross-enrollment/registration in peer systems (e.g., as specified in offer settings or as registered by other workflow components such as the transaction manager (211).

In FIG. 5, the data manager (203) is configured to load data from the data warehouse (149) and/or other data sources for the processing of a transaction that is identified to satisfy the requirements of a trigger record (197) in relation with the action specified in the respective trigger record (197).

In one embodiment, after a payment transaction is identified by the transaction handler (103) in accordance with a trigger record (197), the data manager (203) identifies the action specified in the trigger record (197) as being related to the offer (186) and generates a data object that contains the data of payment transaction as being processed by the transaction handler, data identifying the offer (186) including the workflow (221), and relevant context data for the processing of offer (186) and/or the action identified in the trigger record (197).

In one embodiment, the data manager (203) is configured to make the data object available to the autonomous components, such as the transaction manager (211), the clearing manager (213), the fulfillment manager (215), the discount manager (217), the event manager (207), the notification manager (209), the merchant manager (219), etc., and post a message on the message board (200) to allow the autonomous components to further process the transaction using the data object and in accordance with the workflow (221) identified in the data object.

In one embodiment, each of the autonomous components is configured to watch the message board (200) to detect messages that require their services. When a message on the message board (200) requires the service of a respective autonomous component, the respective autonomous component retrieves the message, performs operations in view of the associated data object, updates the data object with results if there is any, and posts a resulting message on the message board (200), which may cause an autonomous component to render its service in accordance with the workflow (221).

In one embodiment, the event manager (207) is configured to store offer metadata, event rules and actions, location repository data, event history of the user in complex event processing, etc. The event manager (207) is further configured to validate, get/set offer metadata, event rules and actions (e.g., by calling downstream systems for action validation), location data, etc.

In one embodiment, the notification manager (209) is configured to store notification templates. User contact details (e.g., communication reference (195) may be stored in user enrollment record (e.g., 223). In one embodiment, the notification system defines what details are required and workflow manager (201) enforces the requirements. The notification manager (209) is configured to process realtime message requests, validate template including substitution of variables, and send messages via proper media channels.

For example, the notification manager (209) may be called by the event manager (207) to validate that a notification template can be assigned to an event based on the event data.

In one embodiment, the transaction manager (211) is configured to coordinate with the transaction handler (103) for the authorization of the payment transaction in view of the data object.

In one embodiment, the clearing manager (213) is configured to coordinate with the transaction handler (103) for the clearing of the payment transaction in view of the data object.

In one embodiment, the fulfillment manager (215) is configured to store/manage the credit balance and other fulfillment data, such as receipt message template, etc. For example, the fulfillment manager (215) may include an application programming interface (API) to manually issue statement credits, and/or an API to update credit balance.

In one embodiment, the discount manager (217) is configured to store discount templates, listen to enrollment and update discount records for the transaction handler (103) as appropriate, register discount trigger templates with the transaction handler (103), and/or maintain a discount timeout queue for discount timeouts.

In one embodiment, the merchant manager (219) is configured to communicate with an API and/or a user interface to manage merchants.

In FIG. 5, an advanced computing infrastructure is provided for implementing, modifying and/or experimenting with offers and/or loyalty programs. Processing of offers and loyalty programs having different structures can be dynamically configured through the customization of workflows.

In one embodiment, the computing apparatus is implemented using at least one data processing system, as illustrated in FIG. 16, having at least one microprocessor (173) and memory (167) storing instructions configured to instruct the at least one microprocessor (173) to perform the operations described herein. The computing apparatus includes at least one of: the data warehouse (149), the transaction handler (103), the data manager (203), the rule engine (199), the workflow manager (201), the enrollment manager (205), the transaction manager (211), the clearing manager (213), the fulfillment manager (215), the discount manager (217), the event manager (207), the notification manager (209), the merchant manager (219), each of which can be implemented using one or more data processing systems illustrated in FIG. 16.

Apply Offer

In one embodiment, a computing apparatus coupled on the communication path from a transaction terminal (105) that initiates an authorization request for a transaction in a consumer account (146) to an issuer processor (145) in control of the consumer account (146) is configured to apply the benefit of offers (186) to relevant transactions in the consumer account (146), via adjusting the transaction amounts during the processing of the authorization requests. Thus, the application of the offer (186) is integrated in the transaction conducted at the transaction terminal (150) during the time period between transmitting the authorization request for the transaction and approving the transaction based on the authorization response for the transaction.

In one embodiment, the computing apparatus is configured to store information about the offer (186) and determine whether a transaction currently in the process of being authorized in the consumer account (146) is entitled to the benefit of the offer (186); and if so, the computing apparatus is configured to change the transaction amount in propagating the authorization request/response on the communication path to provide the benefit of the offer (186).

In one embodiment, the transaction handler (103) configured to route authorization/settlement requests between acquirer processors (e.g., 147) and issuer processors (145) is configured to enable to real time discount at transaction terminal (105) in accordance with the offer (186) stored, in association with the account data (111) of the user (101), in the data warehouse (149) of the transaction handler (103).

In one embodiment, the transaction handler (103) is not only configured to adjust the transaction amount to apply the benefit of the offer (186) to the qualifying transaction, but also to provide information about the offer (186) applied to the transaction in the authorization response. Thus, the reason for the adjustment of the transaction amount is communicated to the transaction terminal (105) of the merchant in the authorization response that approves the transaction. The information about the applied offer (186) allows the operator of the transaction terminal (105) to make a decision on whether or not to accept the adjusted transaction amount, and/or to request further details about the offer. In one embodiment, the information about the applied offer (186) provided in the authorization response allows the transaction terminal (105) and/or the merchant system to track the redemption progress status of the offer (186), determine the effectiveness of the offer campaign, and/or adjust the offer campaign in real time based on the redemption progress and/or the effectiveness of the offer campaign.

Figure 6:
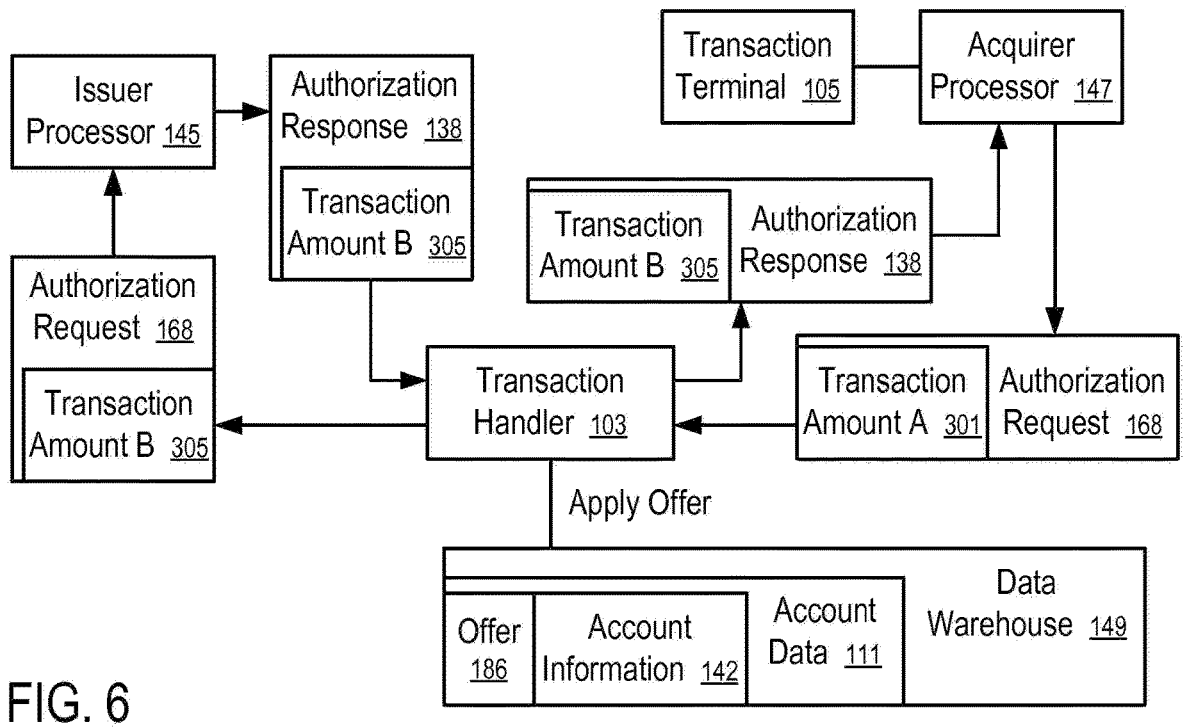
FIG. 6 shows a system to apply a discount offer via an authorization request according to one embodiment.

FIG. 6 shows a system to apply a discount offer via an authorization request according to one embodiment. In FIG. 6, the authorization request (168) from the acquirer processor (147) to the issuer processor (145) is modified by the transaction handler (103) to apply the offer (186) to the transaction that satisfies the requirements of the offer (186).

In FIG. 6, after the transaction handler (103) receives the authorization request (168) from the acquirer processor (147), the transaction handler (103) determines whether the offer (186) is applicable to the transaction associated with the authorization request (168). If the offer (186) is applicable, the transaction handler (103) changes the transaction amount A (301) identified in the authorization request (168) received from the acquirer processor (168) to the transaction amount B (305) in the authorization request (168) transmitted to the issuer processor (145).

If the issuer processor (145) authorizes the transaction amount B (305), the transaction handler (103) transmits to the transaction terminal (105), via the acquirer processor (147), the authorization response (138) to indicate the approval of the transaction amount B (305) and the applicable offer (186).

In one embodiment, the benefit of the offer (186) is sponsored by the merchant. Thus, the arrangement of modifying the transaction amount A (301) requested in the authorization request (168) for the transaction to authorize the transaction amount B (305) that includes the benefit of the applicable offer (186) combines the transaction to charge the consumer account (146) of the user (101) and the transaction to charge the merchant to sponsor the benefit of the offer (186) that is provided to the user (101). Thus, the efficiency of the transaction processing system is improved; and the time period to the completion of the related operations to provide the clear and settle the benefit of the offer is reduced.

In one embodiment, the transaction terminal (105) is configured to accept the modified transaction amount B (305), in view of the indication of the offer (186), and print the receipt that shows the applicable offer (186) and/or the application of the offer (186) to the transaction.

In one embodiment, the authorization request (168) is configured to include an identifier of the offer (186). The transaction terminal (105) is configured to look up the details of the offer (186) (e.g., in a computer system of the merchant) based on the identifier provided in the authorization request (168). In one embodiment, the transaction terminal (105) is configured to present the details of the offer (186) to the operator of the transaction terminal (105) to facilitate the decision of whether or not the transaction is to be accepted. For example, the operator may check the expiration date to ensure that the offer is valid. For example, the operator may request identification information of the user to provide the benefit of the offer. For example, the operator may check for applicable restrictions and/or limitations of the offer (186) in determining whether or not to accept the transaction that has a modified and approved transaction amount B (305) that is reduced from the initial transaction amount A (301).

In one embodiment, the authorization request (168) is configured to include at least certain details of the offer (186), such as a message of the offer (186) identifying the benefit of the offer (186), one or more terms and conditions of the offer (186), an artwork of the offer (186), etc. The details of the offer (186) provided in the authorization request (168) can be presented to the operator of the transaction terminal (105) and/or printed on the receipt of the transaction for the user (101).

In one embodiment, the authorization request (168) is configured to include an identifier of the offer (186) that can be used by the transaction terminal (105) to query the portal (143) for the details of the offer (186) in connection with the transaction. For example, using the identifier of the offer (186), the transaction terminal (105) is configured to query the portal (143) for the message of the offer (186), the artwork of the offer (186), the terms and conditions of the offer (186), the redemption status of the offer (186) (e.g., the count of redemptions within a predetermined period of time, such as a day, a week or a month, the total cost of benefits applied for the offer (186), etc.)

In one embodiment, some details of the offer (186) are provided to the transaction terminal (105) via the authorization response (138), and remaining details of the offer (186) are retrievable from the portal (143) using the information provided in the authorization response (138), such as the identifier of the offer (186) and/or the authorization code (137).

In one embodiment, the authorization response (138) is configured to include an indicator configured to alert the transaction terminal that the transaction amount B (305) approved for the transaction is less than the transaction amount A (301) initialed requested in the authorization request (168), due to the benefit of an offer (186) sponsored by the merchant. The use of the indicator reduces the amount of information to be transmitted to the transaction terminal (105); and the transaction terminal (105) and the portal (143) are configured to subsequently communicate with each other to identify information specific to the offer (186), based on the identification of the transaction, such as the authorization code (137) for the transaction, the date and time of the transaction, etc. In one embodiment, the transaction record (307) of the transaction is configured to be stored in the data warehouse in association with the offer (186), such that when the transaction is identified, the offer applied to the transaction can also be identified.

Figure 7:
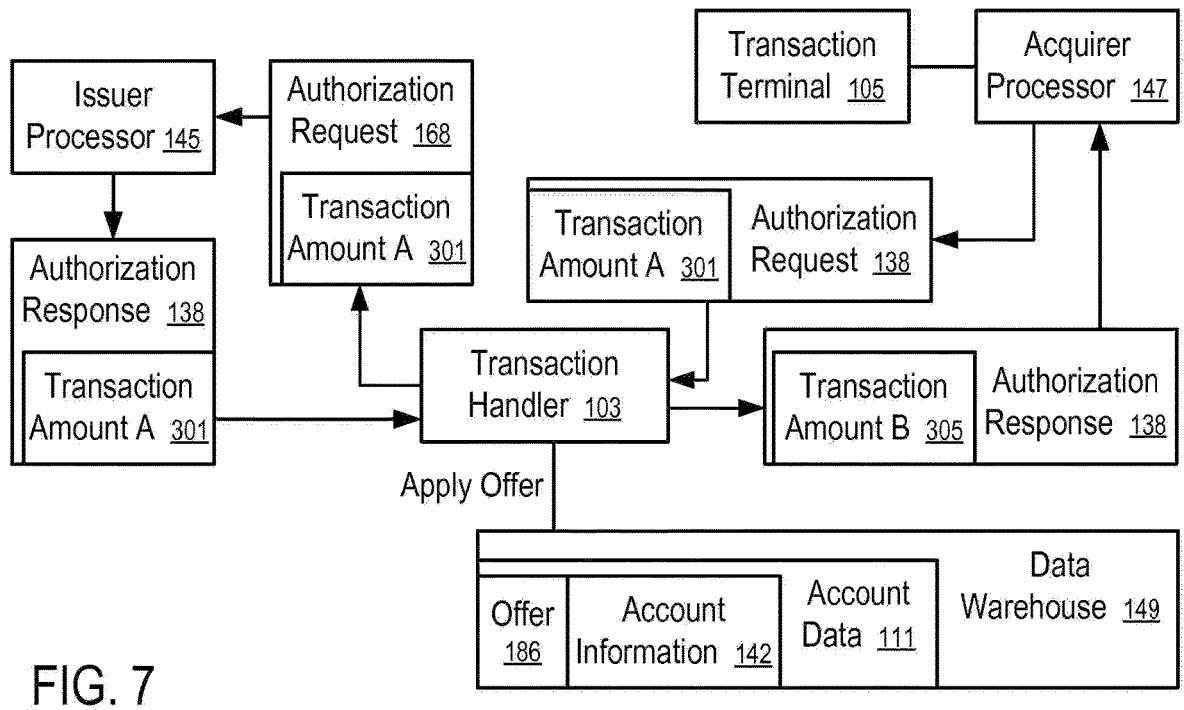
FIG. 7 shows a system to apply a discount offer via an authorization response according to one embodiment.

FIG. 7 shows a system to apply a discount offer via an authorization response according to one embodiment. In one embodiment, the transaction amount A (301) is not modified by transaction handler (103) during the propagation of the authorization request (168) from the acquirer processor (147) to the issuer processor (145). In FIG. 7, the authorization response (138) from the issuer processor (145) to the acquirer processor (147) is modified by the transaction handler (103) to apply the offer (186) to the transaction that satisfies the requirements of the offer (186).

In FIG. 7, after the transaction handler (103) receives the authorization response (138) from the issuer processor (145) approving the transaction, the transaction handler (103) determines whether the offer (186) is applicable to the transaction associated with the authorization response (138). If the offer (186) is applicable, the transaction handler (103) changes the transaction amount A (301) to the transaction amount B (305) in the authorization response (138) transmitted to the acquirer processor (147).

In the embodiment, the authorization response (138) provided to the transaction terminal (105), via the acquirer processor (147), is further configured by the transaction handler (103) to indicate the applicable offer (186). The transaction terminal (105) is configured to accept the modified transaction amount B (305), in view of the indication of the offer (186) presented in the authorization response (138). The modified transaction amount B (305) is different from the initial transaction amount A (301) submitted by the transaction terminal (105) in the authorization request (168) to the acquirer processor (147). The transaction terminal (105) prints the receipt that shows the applicable offer (186) and/or the application of the offer (186) to the transaction.

In one embodiment, the transaction handler (103) is configured to apply the offer (186) during the authorization phase of the transaction to cause the receipt presented by the transaction terminal (105) to show that the benefit of the offer (186) has been applied to the transaction. For example, in one embodiment, the transaction terminal (105) is configured to provide a user interface that allows the merchant to accept the modified transaction amount (305) in view of the applicable offer (186) identified in the authorization response (138).

In one embodiment, the transaction terminal (105) is configured to use the information provided the authorization response to query the portal (143) of the transaction handler (103) to obtain further information about the offer (186) that is applied to the transaction. For example, in one embodiment, the transaction terminal (105) may allow the cashier to optionally view the details of the offers before approving the transaction, when the authorization request (138) indicates that an offer (186) sponsored by the merchant has been applied to the transaction to change the transaction from transaction A (301) to transaction B (305). When the cashier and/or the user (101) requests details of the offer (186) via the user interface, the transaction terminal (105) communicates with the portal (143) to retrieve the details of the offer (186). In one embodiment, the transaction terminal (143) uses at least the authorization code (137) provided in the authorization response (138) to identify the offer (186) being applied. The portal (143) communicates with the transaction terminal (105) to reproduce the presentation (401 or 523) of the offer (186) and/or details of the offer (186), such as terms and requirements of the offer (186), expiration date of the offer (186), etc. In one embodiment, the transaction terminal (105) is configured to optionally print a copy of the offer (186) on the receipt provided for the transaction.

In one embodiment, the issuer processor (145) is configured to apply the offer (186) by change the authorization response (138), after receiving the authorization request (168) from the transaction handler (103) and before providing the authorization response (138) to the transaction handler (103).

In one embodiment, the acquirer processor (147) is configured to apply the offer (186) by changing the transaction amount in the authorization request (168) (e.g., after receiving the authorization request (168) from the transaction terminal (105) and before transmitting the authorization request (168) having the modified transaction amount (305) to the transaction handler (103)), or by changing the transaction amount in the authorization response (138) (e.g., after receiving the authorization response (138) from the transaction handler (103) and before transmitting the authorization response (168) having the modified transaction amount (305) to the transaction terminal (105)).

In one embodiment, after the transaction is approved at the transaction terminal (105) for the modified transaction amount (305), the system is configured to clear and settle the transaction based on the modified transaction amount (305), instead of the initially requested transaction amount (301).

In one embodiment, the transaction handler (103) further uses a communication reference (e.g., a mobile phone number, an email address, an instant message user identifier) that is stored in the account data (111) to provide a notification to the user (101) about the applicable offer (186) and the benefit of the offer (186) that has been applied to the transaction, in parallel with the processing of the authorization request (168) and/or the authorization response (138). Details and examples of using such a communication reference for notification in one embodiment are provided in U.S. patent application Ser. No. 13/152,186, filed Jun. 2, 2011 and entitled "Systems and Methods to Provide Messages in Real-Time with Transaction Processing," the disclosure of which is incorporated herein by reference in its entirety.

In one embodiment, the transaction handler (103) is configured to detect the applicability of the offer (186) during the settlement phase of the transaction and apply the applicable offer (186) during settlement of the transaction.

In one embodiment, the transaction handler (103) is configured to process and settle the transaction that qualifies for the benefit of the offer (186) without modification. To provide the benefit of the offer (186), the transaction handler initiates a separate secondary transaction to issue a statement credit to the consumer account (146) of the user, after the transaction is settled at the full price. For example, in one embodiment, the secondary transaction involves the merchant issuing a refund to the user (101) corresponding to the benefit of the offer (186). In one embodiment, the secondary transaction involves an offer sponsor issuing a refund to the user (101) corresponding to the benefit of the offer (186).

Figure 8:
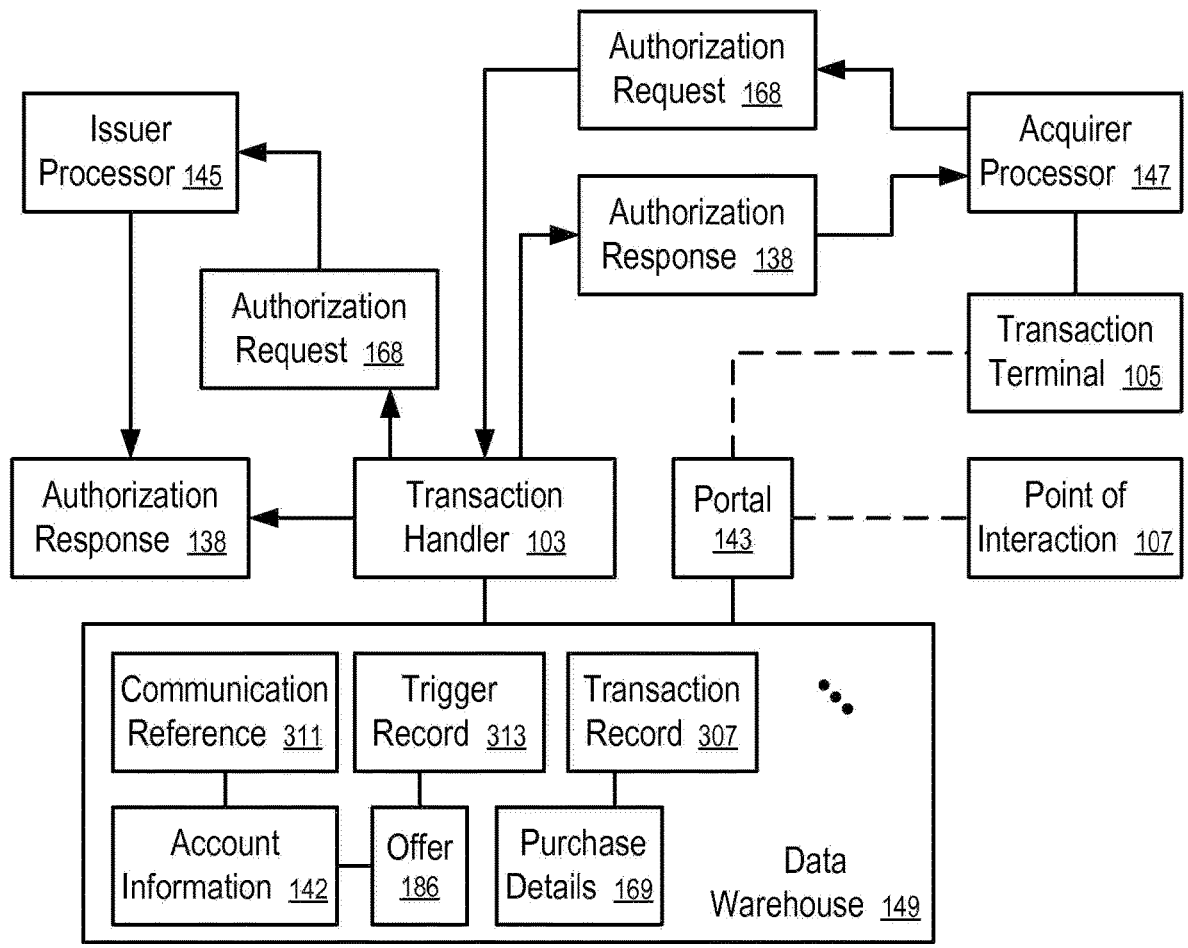
FIG. 8 shows a system to provide the benefit of an offer according to one embodiment.

FIG. 8 shows a system to provide the benefit of an offer according to one embodiment. In FIG. 8, the data warehouse (149) coupled with the transaction handler (103) and the portal (143) is configured to store data associating the offer (186) with the account information (142) of the consumer account (146).

In one embodiment, the portal (143) is configured with a user interface to allow the user (101) of the consumer account (146) specify a communication reference (311) that is stored in association with the account information (142). If the user (101) provides the communication reference (311) for association with the account information (142), the user (101) is provided with notification services using the communication reference (311). Examples of the communication reference (311) include a phone number for notification via voice mails, a mobile phone number for notification via short message service or mobile application, an email address for notification via emails, a user name in an instant messaging system for notification via instant messages, a member ID of a social networking site for notification via messages transmitted via the social networking site, etc.

In FIG. 8, the data warehouse (149) is configured with one or more trigger records associated with the offer (186). The trigger record (313) specifies a set of conditions and identifies an action, which is to be performed when a transaction processed by the transaction handler (103) satisfies the set of conditions. In one embodiment, the set of conditions specified in the trigger record is a subset of conditions for the redemption of the benefit of the offer (186). For improved performed, the conditions for the trigger records is based on a standardized set of conditions common to many different operations. The action associated with the trigger generated for the offer (186) identifies the offer (186) can cause the transaction handler (103) and/or the portal (143) to determine whether or not the transaction meet all of the benefit redemption requirements of the offer (186) and if so, to modify the transaction amount during the authorization of the transaction.

In FIG. 8, when the account information (142) is used at the transaction terminal (105) (e.g., a point of sales device) to initiate a transaction in the consumer account (146), the transaction terminal (105) communicates with the acquirer processor (147) to generate an authorization request (168). The transaction handler (103) is configured to receive the authorization request (168) from the acquirer processor (147) and identify the issuer processor (145) based on the account information (142) provided in the authorization request (168).

In one embodiment, a trigger record (313) is configured to determine whether the transaction handler (103) is to check the offer (186) for the application of the offer (186). When the account information (142) provided in the authorization request (168) and/or other information as identified in the authorization request (168), such as the identity of the merchant operating the transaction terminal (105), satisfies the requirement of the trigger record (313), the trigger record (313) instructs the transaction handler (103) to determine the applicability of the offer (186) to the transaction for which the authorization request (168) is submitted (or for which the authorization response (138) is provided). The use of the trigger record (313) to trigger the transaction handler (103) to check the applicability of the offer (186) improves the efficiency of the transaction handler (103) by optimized requirement checking operations relative to the trigger records and by filtering out transactions that do not meet the requirements of the trigger records.

In FIG. 8, transaction handler (103) is configured to determine whether or not the offer (186) is applicable to the authorization request (168), after receiving the authorization request (168) from the acquirer processor (147) and prior to sending the corresponding authorization request (168) to the issuer processor (145) associated with the account information (142). If the offer is applicable to the transaction associated with the authorization request (168), the transaction handler (103) changes the transaction amount according to the offer (186) and uses the changed transaction amount to communicate with the issuer processor (145) for the authorization of the transaction, in a way as illustrated in FIG. 6.

For example, the offer (186) provides the benefit of a discount, such as a predetermined percentage off the purchase from the merchant operating the transaction terminal (105), if the transaction amount is above a threshold. For example, a merchant may offer a 10% discount towards a purchase of at least $50.00 within a predetermined period of time.

In one embodiment, the redemption requirement of the offer (186) is based on a plurality of transactions. For example, a merchant may offer a 20% discount to the 11th transaction if the user (101) makes 10 purchases each meeting the minimum purchase requirement of $5.00.

In one embodiment, the benefit of the offer (186) is computed with the consideration of sales tax. For example, the authorization request (168) received from the acquirer processor (147) includes information about the sales tax rate; the transaction amount includes the sales tax; and the transaction handler (103) is configured to determine the pre-tax purchase amount to determine whether the offer (186) is applicable. For example, if the offer (186) is applicable, the transaction handler (103) is configured to adjust the pre-tax purchase amount and compute the sales tax based on the adjusted purchase amount to determine the adjusted transaction amount.

In one embodiment, the redemption of the offer (186) is based on item-level purchase details (169). For example, a merchant or manufacturer may offer the deal of "buy 2 blue shirts, receive the 3rd free," or "buy 5 specialty drinks and receive 6th free."

In one embodiment, the transaction terminal (105) is configured to include the purchase details (169) in the authorization request (168). The data warehouse (149) is configured to store the purchase details (169) that are relevant to the offer (186).

In one embodiment, the transaction terminal (105) is configured to present a user interface to allow the user (101) to determine whether or not to allow the transaction terminal (105) to provide the purchase details (169) to the transaction handler (103) in the authorization request (168). Thus, when the user (101) determines that the purchase is relevant to the offer (186) previously saved in the data warehouse (149), the user (101) may provide the consent to the user interface to allow the transaction terminal (105) to include the purchase details (169) in the authorization request (168).

In one embodiment, the offers that require item level purchase details (169) are provided to users (101) of a particular type of consumer accounts; and the use of the consumer account (146) represents the user consent to allow transaction terminals (e.g., 105) to transmit the purchase details (169) to the transaction handler (103) for various services that are based on item level purchase details (169). The transaction terminal (105) is configured to selectively transmit the purchase details (169) based on the type of the consumer accounts used in the transactions.

In one embodiment, the portal (143) is configured to communicate with the transaction terminal (105) during the processing of the authorization request (168). After the authorization request (168) is received from the acquirer processor (147), the transaction handler (103) and/or the portal (143) is configured to determine whether to request the purchase details (169) are required to determine whether the offer (186) is applicable to the transaction.

In one embodiment, the transaction handler (103) is configured to identify certain transactions that are not qualified for the offer (186) based on the authorization request (168) without the purchase details (169). For example, when the transaction merchant category (306) is not in a predetermined set of merchant categories, the offer (186) is not applicable in one embodiment. For example, when the transaction amount (304) is not in a predetermined range, the offer (186) is not applicable in one embodiment. For example, when the transaction channel (307) of the authorization request (168) is not a predetermined channel, the offer is not applicable in one embodiment.

In one embodiment, after the transaction handler (103) and/or the portal (143) determines that the purchase details (169) is required to determine whether the offer (186) is applicable to the transaction represented/identified by the authorization request (168), the portal (143) is configured to communicate with the transaction terminal (105) to determine the applicability of the offer (186). For example, the portal (143) is configured in one embodiment to request the transaction terminal (105) to provide the purchase details (169) to determine whether the transaction is eligible for the benefit of the offer (186) during the processing of the authorization request (168). Alternative, the portal (143) is configured to identify the item level requirements to the transaction terminal (105) and query the transaction terminal (105) to determine whether the transaction represented/identified by the authorization request (168) satisfies the item level requirement(s) associated with the offer (186).

After the authorization request (168) received from the acquirer processor (147) is processed to include the benefit of the applicable offer (186), if any, the transaction handler (103) transmitted the authorization request (168) that is a result of the application of the benefit of the applicable offer (186). Thus, the issuer processor (145) does not involve in the processing of the offer (186).

Alternatively, the application of the offer (186) is implemented via the issuer processor (145), instead of the transaction handler (103); and the issuer processor (145) is configured to store the offer (186) in its data storage device and apply the offer (186) in a way similar to that described above in connection with the transaction handler (103). However, implementing the application of the offers (e.g., 186) at the transaction handler (103) provides a system more efficient than a system that implements the application of the offers (e.g., 186) at individual issuer processors (e.g., 145) are connected with the transaction handler (103) for the routing of authorization requests (168) and authorization responses (138), by reducing the overall resource requirement of the entire system and reducing the data communication requirements of the system.

After the transaction handler (103) applies the offer (186) that is associated with the account information (142) in the data warehouse (149) coupled with the transaction handler (103), the transaction handler (103) is configured to receive from the issuer processor (145) the authorization response (138) corresponding to the authorization request (168). If the transaction is approved, the authorization response (138) identifies the approved transaction amount, which includes the benefit of the offer (186).

In one embodiment, the benefit of the offer (186) includes the reduced transaction amount that is less than the transaction amount initially specified in the authorization request (186) transmitted from the transaction terminal (105) and/or the acquirer processor (147). Thus, the authorized amount in the authorization response (138) transmitted to the acquirer processor is smaller than the requested amount in the authorization request (168) received from the acquirer processor (147).

In one embodiment, the transaction handler (103), or the issuer processor (145), is further configured to provide information about the offer (186) that is applied to the authorization request (168) in the authorization response (168). For example, the authorization response (138) in one embodiment includes a message to be printed on the receipt of the transaction to identify the offer (186) and to indicate that the benefit of the offer (186) has been provided to the transaction. For example, the authorization response (138) in one embodiment identifies the original total amount of the transaction, the adjusted amount of the transaction, a code identifying the offer (186), a message describing the offer (186), and/or the amount of the offer (186), etc.

In one embodiment, an indicator in the authorization is set to request the transaction terminal (105) to accept the modified transaction amount (105). The operation of the transaction terminal (105) may request the portal (143) to provide further details of the offer (186) to approve the transaction.

For example, in one embodiment, the transaction terminal (105) is configured to use at least the authorization code (137) to request the portal (143) to display the offer (186) that is being applied to the transaction approved by the authorization code (137). Alternatively, the transaction handler (103) may provide, in the authorization response (138), an identifier separate from the authorization code (137) to identify offer (186); and the transaction terminal (105) is configured to use the identifier to retrieve details of the offer (186) for presentation on the transaction terminal (105) and/or on the receipt provided to the user (101).

In FIG. 8, the transaction terminal (105) is configured to present the information about the offer (186) provided in the authorization response (138). Thus, the user (101) can verify the application of the offer (186) to the transaction from the receipt produced by the transaction terminal (105). For example, the transaction terminal (105) uses a printer to produce a paper receipt.

In one embodiment, when the authorization response (138) received from the issuer processor (145) indicates the approval of the transaction that receives the benefit of the offer (186), the portal (143) is configured to use the communication reference (311) to send a notification to the point of interaction (107) of the user (101). The notification includes at least some of the above discussed information about the offer (186) that is applied to the authorization request (168) in the authorization response (168).

In one embodiment, the information about the offer (186) is provided via both the authorization response (138) and the notification to the point of interaction (107) separate from the transaction terminal (105). An example of the point of interaction (107) is a mobile device, such as a mobile phone, a portal media player, or a personal digital assistant of the user (101).

In one embodiment, when the information about the offer (186) is delivered via the communication reference (311), the same information is not provided via the authorization response (138).

In one embodiment, the authorization response (138) includes data about the application of the offer (186) to facilitate accounting by the merchant system that includes the transaction terminal (105). For example, data provided in the authorization response (138) allows the back-end account system connected to the transaction terminal (105) to identify the promotion code/data of the offer (186), the promotion amount, and/or the final sale amount, etc., from the data provided in the authorization response (138). In one embodiment, the back-end accounting system stores various information for the purchase transaction, including the full sale amount, the identification of the offer (186) that has been applied to the transaction, the reduction amount in the sale amount, the final sale amount, tender type, etc.

In one embodiment, the portal (143) is configured to show to relevant merchants and/or users (101) reports associated with the offers (e.g., 186), such as the offers (e.g., 186) that have been applied with relevant transaction records (307) and purchase details (169).

In FIG. 8, the application of the offer (186) is implemented via the transaction handler (103). Alternatively, the application of the offer (186) can be implemented in the acquirer processor (147), or the issuer processor (145), in a way similar to that described above in connection with the transaction handler (103).

Figure 9:
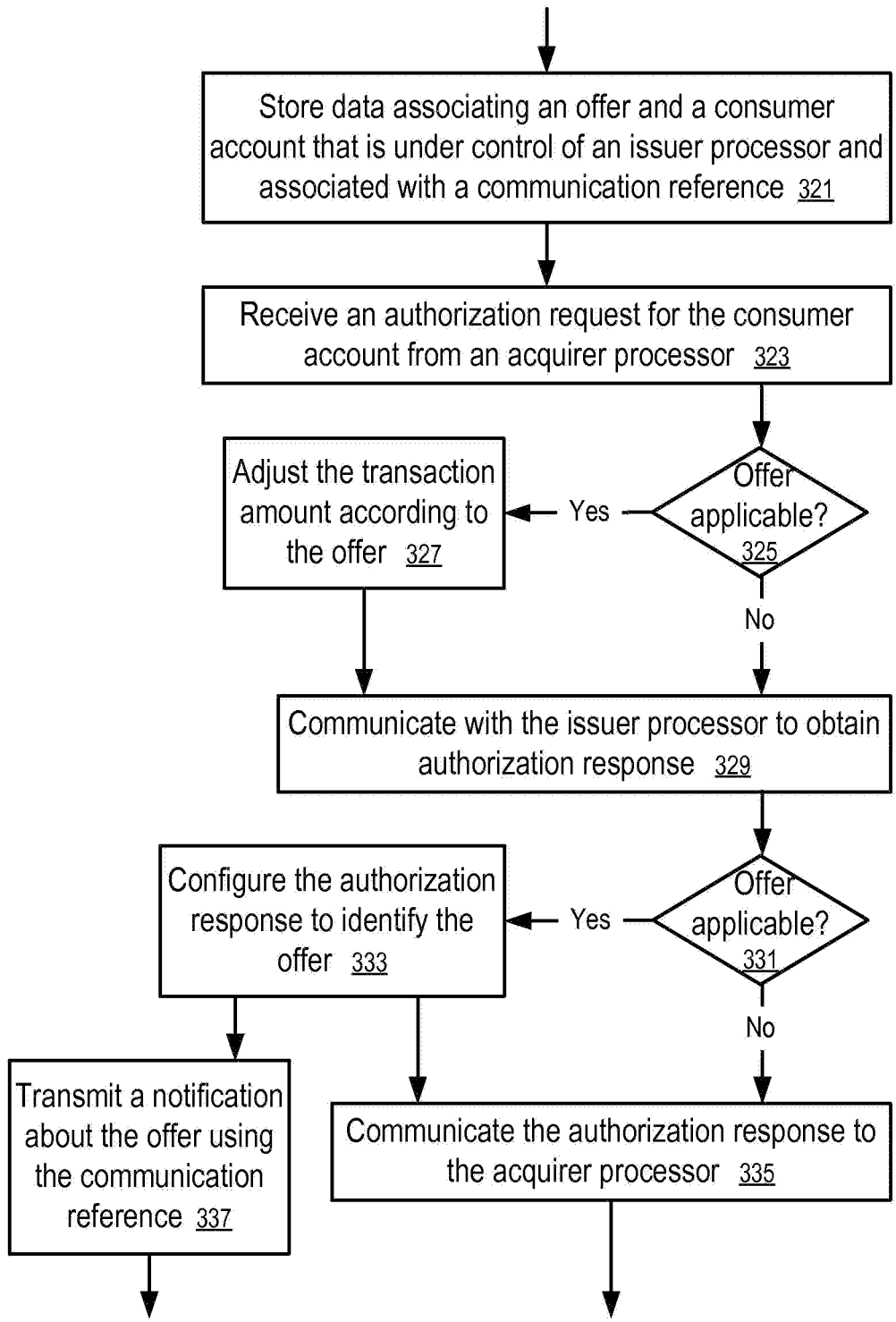
FIG. 9 shows a method to provide the benefit of an offer according to one embodiment.

FIG. 9 shows a method to provide the benefit of an offer according to one embodiment. In FIG. 9, a computing apparatus is configured to store (321) data associating an offer (186) and a consumer account (146) that is under control of an issuer processor (145) and associated with a communication reference (311), and receive (323) an authorization request (168) for the consumer account (146) from an acquirer processor (147). In response to the authorization request (168), the computing apparatus determines (325) whether the offer (186) is applicable; and if so, the computing apparatus adjusts (327) the transaction amount according to the offer (186) and communicates (329) with the issuer processor (145) to obtain authorization response (138).

Prior to communicating (335) the authorization response (138) to the transaction terminal (105) via the acquirer processor (138), the computing apparatus is configured to determine whether the offer (186) is applicable; and if so, the computing apparatus configures (333) the authorization response to identify the offer (186) and the benefit applied to the transaction in accordance with the offer (186) (e.g., the reduced transaction amount).

In one embodiment, when the authorization response approves the transaction, the computing apparatus is configured to optionally transmit (337) a notification about the offer (186) to the point of interaction (107) of the user (101) using the communication reference (311).

In one embodiment, the computing apparatus includes at least one of: the data warehouse (149), the transaction handler (103), the portal (143), the issuer processor (145), the acquirer processor (147), the transaction terminal (105) and the point of interaction (107), which of each can be implemented using one or more data processing systems as illustrated in FIG. 12, with more or less computers.

In one embodiment, the computing apparatus is configured to: store an offer (186) in association with an account (142) of a user (101); receive, in a transaction handler (103) coupled between a plurality of issuer processors (e.g., 145) and a plurality of acquirer processors (e.g., 147), an authorization request (168) from an acquirer processor (147) associated with a merchant for a transaction in a consumer account (146) under control of an issuer processor (145); determine whether or not to provide a benefit of the offer (186) to the transaction, after receiving the authorization request (168) in the transaction handler (103); in response to a determination that the benefit of the offer (186) is be provided to the transaction, modify by the transaction handler (103) a transaction amount (301, 305) of the transaction prior to providing an authorization response (168) to the acquirer processor (147); and embed information in the authorization response (138) to identify the offer (186) applied to the transaction. In one embodiment, the authorization request (168) received from the acquirer processor (147) requests authorization of a first transaction amount (301) from the consumer account (146); and the authorization response (138) provided to the acquirer processor (147) authorizes a second transaction amount (305) less than the first transaction amount (301) to provide the benefit of the offer (186).

In one embodiment, the information embedded in the authorization response (138) includes an indicator configured to cause a transaction terminal (105) of the merchant to prompt an operator of the transaction terminal (105) to accept the second transaction amount (305) specified in the authorization response (138). In one embodiment, the information further includes details of the offer (186) to be presented to the operator before the transaction is accepted at the transaction terminal (105).

In one embodiment, the transaction terminal is configured to print on a receipt for the transaction the details of the offer (186) applied to the transaction, such as a message of the offer (186), artwork of the offer (186), etc.

In one embodiment, the modifying of the transaction amount includes transmitting to the issuer processor an authorization request (168) identifying the second transaction amount (305) for the transaction. Alternatively, the authorization request (168) received from the acquirer processor (147) is forwarded by the transaction handler (103) to the issuer processor (145) without modifying the transaction amount; responsive to the authorization request (168), the transaction handler (103) receives a response from the issuer processor (145) approving the first transaction amount (301); in response, the transaction handler (103) is configured to generate the authorization response (168) to include the information identifying the offer (186) applied to the transaction and to identify the second transaction amount (305) approved for the transaction, in view of the benefit of the offer (186); and the transaction handler (103) is configured to transmit the authorization response (168) to the acquirer processor (147).

In one embodiment, the portal (143) is configured to generate a trigger record identifying the offer (186) and a subset of requirements of the offer. The transaction handler (103) is configured to monitor transactions to identify the transaction that satisfies the subset of the requirements identified in the trigger record. The determining of whether or not to provide a benefit of the offer (186) to the transaction is in response to a determination that the transaction satisfies the subset of requirements identified in the trigger record.

In one embodiment, the information provided in the authorization response (138) about the offer (186) includes an indicator indicating that the transaction amount of the transaction is modified (301, 305) in view of the offer (186) sponsored by the merchant.

In one embodiment, the indicator includes a unique identifier identifying the offer from a plurality of offers provided by the merchant.

In one embodiment, after the authorization response (138) is transmitted to the acquirer processor (147), a portal (143) is configured to receive a subsequent request from a transaction terminal (105) of the merchant to request a presentation of the offer (186); and the portal (143) is configured to provide the presentation of the offer (186) to the transaction terminal (105) in response to the subsequent request received in the portal (143) via a communication channel separated from the channel used for the exchange of the authorization messages (e.g., 138 and 168).

In one embodiment, the subsequent request is configured to include at least an authorization code (137) provided to the authorization response (138).

In one embodiment, whether or not to provide the benefit of the offer (168) to the transaction is based at least in part on item level transaction details, such as item level transaction details received in the authorization request (168), or received in the portal (143) in response to a determination that transaction details are required to determine whether or not to apply the benefit of the offer to the transaction, determined after the authorization request is received in the transaction handler (103) from the acquirer processor (147). In one embodiment, the transaction details are received in the portal (143) from the transaction terminal (105) prior to the transaction handler (103) providing the authorization response to the acquirer processor (147).

Variations

Some embodiments use more or fewer components than those illustrated in the figures.

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

In one embodiment, the products and/or services purchased by the user (101) are also identified by the information transmitted from the merchants or service providers.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

Transaction Processing and Data

FIG. 13 shows a system to provide information and/or services based on transaction data (109) according to one embodiment.

In FIG. 13, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles (127), aggregated spending profile, offer redemption notification, etc. The portal (143) may be implemented as a web portal, a telephone gateway, a file/data server, etc.

In FIG. 13, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

The accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

In FIG. 13, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

The account identification device (141) of one embodiment is a plastic card having a magnetic strip storing account information (142) identifying the consumer account (146) and/or the issuer processor (145). Alternatively, the account identification device (141) is a smartcard having an integrated circuit chip storing at least the account information (142). The account identification device (141) may optionally include a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

The transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

The account identification device (141) may include security features to prevent unauthorized uses of the consumer account (146), such as a logo to show the authenticity of the account identification device (141), encryption to protect the account information (142), etc.

The transaction terminal (105) of one embodiment is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In general, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Dedicated communication channels may be used between the transaction handler (103) and the issuer processor (145), between the transaction handler (103) and the acquirer processor (147), and/or between the portal (143) and the transaction handler (103).

In FIG. 13, the transaction handler (103) uses the data warehouse (149) to store the records about the transactions, such as the transaction records or transaction data (109).

Typically, the transaction handler (103) is implemented using a powerful computer, or cluster of computers functioning as a unit, controlled by instructions stored on a computer readable medium. The transaction handler (103) is configured to support and deliver authorization services, exception file services, and clearing and settlement services. The transaction handler (103) has a subsystem to process authorization requests and another subsystem to perform clearing and settlement services. The transaction handler (103) is configured to process different types of transactions, such credit card transactions, debit card transactions, prepaid card transactions, and other types of commercial transactions. The transaction handler (103) interconnects the issuer processors (e.g., 145) and the acquirer processor (e.g., 147) to facilitate payment communications.

In FIG. 13, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In FIG. 13, the issuer processor (145) is configured to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. The funds can be transferred electronically.

The transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records, such as merchant category, transaction date, amount, etc. Examples and techniques in one embodiment are provided in U.S. Pat. App. Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. Pat. App. Pub. No. 2009/0048884, and entitled "Merchant Benchmarking Tool," the disclosure of which application is hereby incorporated herein by reference.

Transaction Terminal

FIG. 14 illustrates a transaction terminal according to one embodiment. The transaction terminal (105) illustrated in FIG. 14 can be used in various systems discussed in connection with other figures of the present disclosure. In FIG. 14, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 14. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 14. For example, in one embodiment, the transaction terminal (105) is an ATM machine, which includes components to dispense cash under certain conditions.

Account Identification Device

FIG. 15 illustrates an account identifying device according to one embodiment. In FIG. 15, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 15, such as a cellular communications subsystem.

In one embodiment, the communication device (159) may access the account information (142) stored on the memory (167) without going through the processor (151).

In one embodiment, the account identification device (141) has fewer components than those illustrated in FIG. 15. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 16, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the components of systems illustrated in various figures, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the components such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system (170) illustrated in FIG. 16. Some of the components may share hardware or be combined on a computer system. In one embodiment, a network of computers can be used to implement one or more of the components.

Further, the data illustrated in the figures, such as transaction data (109), account data (111), transaction profiles (127), and advertisement data (135), can be stored in storage devices of one or more computers accessible to the corresponding components. For example, the transaction data (109) can be stored in the data warehouse (149) that can be implemented as a data processing system illustrated in FIG. 16, with more or fewer components.

In one embodiment, the transaction handler (103) is a payment processing system, or a payment card processor, such as a card processor for credit cards, debit cards, etc.

FIG. 16 illustrates a data processing system according to one embodiment. While FIG. 16 illustrates various components of a computer system, it is not intended to represent any particular architecture or manner of interconnecting the components. One embodiment may use other systems that have fewer or more components than those shown in FIG. 16.

In FIG. 16, the data processing system (170) includes an inter-connect (171) (e.g., bus and system core logic), which interconnects a microprocessor(s) (173) and memory (167). The microprocessor (173) is coupled to cache memory (179) in the example of FIG. 16.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. At least one non-transitory computer readable medium comprising instructions that, when executed by at least one processor, cause the at least one processor to:
   store, by a portal in a data warehouse coupled thereto, a first record identifying a first value retrievable for application to a transaction that satisfies a set of conditions associated with the first record, the first value being less than a threshold;
   receive, in the portal over a first communication channel, an input identifying a second value applicable to transactions that satisfy the set of conditions;
   determine, by the portal, a sum of the first value and the second value is above the threshold;
   update, by the portal, the first record to identify a third value equal to the threshold;
   create, by the portal in the data warehouse, a second record associated with the set of conditions, wherein the second record identifies a difference between the threshold and the sum of the first value and the second value;

generate, by the portal in the data warehouse, a trigger record to monitor the first record, wherein the trigger record identifies a subset of the set of conditions;

process, by a transaction handler separate from the portal and coupled to the data warehouse, a plurality of transactions, each transaction of the plurality of transactions comprising an authorization communication received by the transaction handler over a second communication channel separate from the first communication channel, the second communication channel dedicated to communication of the authorization communication of each transaction of the plurality of transactions;

determine, by the transaction handler, a first transaction of the plurality of transactions triggers the trigger record based on the authorization communication satisfying the subset of the set of conditions identified by the trigger record;

in response to a determination that the first transaction triggers the trigger record, determine, by the portal, whether the first transaction satisfies the set of conditions; and in response to a determination that the first transaction satisfies the set of conditions, retrieve, by the transaction handler, at least a portion of the third value from the first record and apply the portion of the third value to the first transaction while the first transaction is being processed in the transaction handler.

2. The at least one non-transitory computer readable medium of claim 1, wherein the second record is independent of the first record and capable of being monitored for application to a transaction that satisfies the set of conditions.

3. The at least one non-transitory computer readable medium of claim 2, wherein the first record and the second record are tracked as a group for association with the set of conditions.

4. The at least one non-transitory computer readable medium of claim 3, wherein generating the trigger record comprises generating, by the portal, the trigger record to monitor the first record without monitoring the second record.

5. The at least one non-transitory computer readable medium of claim 1, wherein applying the portion of the third value to the first transaction comprises reducing, by the transaction handler, a transaction amount of the authorization communication by an amount equal to the portion of the third value.

6. The at least one non-transitory computer readable medium of claim 1, wherein the instructions, when executed by the at least one processor, further cause the at least one processor to:

after the portion of the third value is retrieved and applied to the first transaction, move, by the transaction handler, at least a portion of a value in the second record to the first record without exceeding the threshold.

7. The at least one non-transitory computer readable medium of claim 6, wherein the instructions, when executed by the at least one processor, further cause the at least one processor to:

schedule, by the transaction handler, the moving in a background process for execution at a time after the first transaction is processed.

8. The at least one non-transitory computer readable medium of claim 6, wherein the instructions, when executed by the at least one processor, further cause the at least one processor to:

after the moving, delete, by the transaction handler, the second record in response to a determination that a value in the second record becomes zero.

9. The at least one non-transitory computer readable medium of claim 1, wherein the instructions, when executed by the at least one processor, further cause the at least one processor to:

store, in the data warehouse, data identifying a discount offer;

process, by the transaction handler, a second transaction;

determine, by the transaction handler, that the second transaction satisfies requirements of the discount offer; and determine, by the transaction handler, the second value to generate the input based on the discount offer.

10. The at least one non-transitory computer readable medium of claim 9, wherein the second value is further determined based on a transaction amount of the second transaction.

11. The at least one non-transitory computer readable medium of claim 9, further comprising:

determining, by the transaction handler, a fourth value in accordance with the discount offer, wherein the fourth value does not exceed the threshold, wherein the at least the portion of the third value retrieved from the first record is equal to the fourth value.

12. The at least one non-transitory computer readable medium of claim 11, wherein the fourth value is less than the threshold for a partial redemption of discounts aggregated in the first record.

13. A computing system, comprising:

a portal coupled to a first communication channel;

a transaction handler separate from the portal, the transaction handler coupled to a second communication channel separate from the first communication channel; and a data warehouse coupled with the transaction handler and the portal, the data warehouse storing a first record identifying a first value retrievable for application to a transaction that satisfies a set of conditions associated with the first record, the first value being less than a threshold, wherein the portal is configured to receive, over the first communication channel, an input identifying a second value applicable to transactions that satisfy the set of conditions, to determine a sum of the first value and the second value is below the threshold, and to update the first record to identify a third value equal to the sum of the first value and the second value, wherein the portal is configured to generate a trigger record to monitor the first record, wherein the trigger record identifies a subset of the set of conditions, wherein the transaction handler is configured to process a plurality of transactions received over the second communication channel, each transaction of the plurality of transactions comprising an authorization communication, wherein the second communication channel is dedicated to communication of the authorization communication of each transaction of the plurality of transactions, and the transaction handler is configured to determine a first transaction of the plurality of transactions triggers the trigger record based on the authorization communication satisfying the subset of the set of conditions identified by the trigger record, wherein, in response to a determination that the first transaction triggers the trigger record, the portal is configured to determine whether the first transaction satisfies the set of conditions; and in response to a determination that the first transaction satisfies the set of conditions, the transaction handler is configured to retrieve at least a portion of the third value from the first record and apply the portion of the third value to the first transaction while the first transaction is being processed for authorization via the transaction handler.

14. The computing system of claim 13, wherein the data warehouse is further configured to store data identifying a discount offer, and during processing of a second transaction, the transaction handler is configured to make a determination that the second transaction satisfies requirements of the discount offer and compute the second value to generate the input based on the discount offer.

15. The computing system of claim 14, wherein the transaction handler is configured to determine a fourth value in accordance with the discount offer, wherein the fourth value does not exceed the threshold, wherein the at least the portion of the third value retrieved from the first record is equal to the fourth value; and the fourth value is less than the threshold for a partial redemption of discounts aggregated in the first record.

16. The computing system of claim 13, wherein the transaction handler is configured to modify a transaction amount authorized for the first transaction to apply the portion of the third value to the first transaction during the authorization of the first transaction.

17. At least one non-transitory computer readable medium comprising instructions that, when executed by at least one processor, cause the at least one processor to:

store, by a portal in a data warehouse coupled thereto, a first record identifying a first value retrievable for application to a transaction that satisfies a set of conditions associated with the first record, the first value being less than a threshold;

receive, in the portal over a first communication channel, an input identifying a second value applicable to transactions that satisfy the set of conditions;

determine, by the portal, a sum of the first value and the second value is below the threshold;

update, by the portal, the first record to identify a third value equal to the sum of the first value and the second value;

generate, by the portal in the data warehouse, a trigger record to monitor the first record, wherein the trigger record identifies a subset of the set of conditions;

process, by a transaction handler separate from the portal and coupled to the data warehouse, a plurality of transactions, each transaction of the plurality of transactions comprising an authorization communication received by the transaction handler over a second communication channel separate from the first communication channel, the second communication channel dedicated to communication of the authorization communication of each transaction of the plurality of transactions;

determine, by the transaction handler, a first transaction of the plurality of transactions triggers the trigger record based on the authorization communication satisfying the subset of the set of conditions identified by the trigger record;

in response to a determination that the first transaction triggers the trigger record, determine, by the portal, whether the first transaction satisfies the set of conditions; and in response to a determination that the first transaction satisfies the set of conditions, retrieve, by the transaction handler, at least a portion of the third value from the first record and apply the portion of the third value to the first transaction while the first transaction is being processed in the transaction handler.

18. The at least one non-transitory computer readable medium of claim 17, wherein the instructions, when executed by the at least one processor, further cause the at least one processor to:

store, in the data warehouse, data identifying a discount offer;

process, by the transaction handler, a second transaction;

determine, by the transaction handler, that the second transaction satisfies requirements of the discount offer; and determine, by the transaction handler, the second value to generate the input based on the discount offer.

19. The at least one non-transitory computer readable medium of claim 18, wherein the second value is further determined based on a transaction amount of the second transaction.

20. The at least one non-transitory computer readable medium of claim 18, wherein the instructions, when executed by the at least one processor, further cause the at least one processor to:

determine, by the transaction handler, a fourth value in accordance with the discount offer, wherein the fourth value does not exceed the threshold, wherein the at least the portion of the third value retrieved from the first record is equal to the fourth value.

* * * * *